US008217759B2

(12) United States Patent
Tessier

(10) Patent No.: US 8,217,759 B2
(45) Date of Patent: Jul. 10, 2012

(54) SYSTEMS AND METHODS FOR DETECTING ACTIVITIES

(75) Inventor: Paul Tessier, Lynnfield, MA (US)

(73) Assignee: Consortium P, Inc., Rochester, NH (US)

( * ) Notice: Subject to any disclaimer, the term of this patent is extended or adjusted under 35 U.S.C. 154(b) by 266 days.

(21) Appl. No.: 12/357,370

(22) Filed: Jan. 21, 2009

(65) Prior Publication Data

US 2009/0184823 A1    Jul. 23, 2009

Related U.S. Application Data

(60) Provisional application No. 61/011,649, filed on Jan. 18, 2008.

(51) Int. Cl.
*H04Q 5/22* (2006.01)

(52) U.S. Cl. .................................... 340/10.1; 340/572.1
(58) Field of Classification Search ................. 340/10.1, 340/572.1, 573.1
See application file for complete search history.

(56) References Cited

U.S. PATENT DOCUMENTS

| 7,260,558 B1* | 8/2007 | Cheng et al. ................. 706/12 |
| 2005/0110640 A1* | 5/2005 | Chung ...................... 340/572.1 |
| 2007/0273514 A1 | 11/2007 | Winand et al. |
| 2009/0184823 A1* | 7/2009 | Tessier .................... 340/568.1 |

OTHER PUBLICATIONS

International Search Report for Application No. PCT/US09/31615, dated Mar. 9, 2009.

* cited by examiner

*Primary Examiner* — Shirley Lu
(74) *Attorney, Agent, or Firm* — Maine Cernota & Rardin

(57) ABSTRACT

Exemplary embodiments provide systems and methods for detecting activities and determining information about the activities. Exemplary embodiments use one or more items of context information on one or more objects to detect an activity. Examples of context information include, but are not limited to, identities of objects, roles or activities associated with objects, locations/locales of objects, historical locations/locales of objects, associations between objects, duration of associations between objects, etc. Upon detecting an activity, exemplary embodiments also determine information about the detected activity.

50 Claims, 23 Drawing Sheets

SYSTEMS AND METHODS FOR DETECTING ACTIVITIES

RELATED APPLICATIONS

This application claims priority to a U.S. Provisional Patent Application Ser. No. 61/011,649, filed Jan. 18, 2008, entitled "Context Knowledge Based On Location." The contents of the aforementioned application are incorporated herein by reference.

BACKGROUND

Objects can be located and tracked using location systems. This ability to locate and track objects can be used to detect and track interactions and associations between an object and other objects and/or locations. Sites using location systems are typically responsible for ensuring that certain tasks are being performed. For example, a hospital using a location system may be responsible for ensuring that hospital personnel are performing their assigned tasks, e.g. doctors and nurses making rounds, janitors cleaning rooms, surgeons performing surgery, nurses administering medication, phlebotomists drawing blood, technicians taking electrocardiograms (EKGs) on patients, telemetry patients ambulating, etc.

SUMMARY

Exemplary embodiments provide systems and methods for detecting or determining activities involving one or more objects, and determining information associated with the detected activities. Exemplary embodiments use context information about the one or more objects involved in an activity to detect the activity. Examples of detected activities/activity types include, but are not limited to, doctors and nurses making rounds, janitors cleaning rooms, surgeons performing surgery, nurses administering medication, phlebotomists drawing blood, technicians taking electrocardiograms (EKGs) on patients, telemetry patients ambulating, etc. Examples of context information include, but are not limited to, identities of objects, roles and/or activities associated with objects, locations/locales of objects, historical locations/locales of objects, associations between objects, durations of associations between objects, etc.

Upon detecting an activity, exemplary embodiments also determine information about the detected activity. Examples of activity information include, but are not limited to, the type of the activity, the identities and roles of objects involved in the activity, the time of the activity, the duration of the activity, the primary location and/or locale of the activity, the primary location and/or locale of an object during the activity, etc.

Although many of the examples listed herein have been made with reference to a hospital environment, exemplary embodiments can be used to detect activities and determine activity information in any environment and industry.

BRIEF DESCRIPTION OF THE DRAWINGS

The accompanying drawings, which are incorporated herein and constitute a part of this specification, illustrate one or more embodiments of the invention and, together with the description, explain the invention. In the drawings.

DETAILED DESCRIPTION

I. Summary of Exemplary Embodiments

Figure 1:
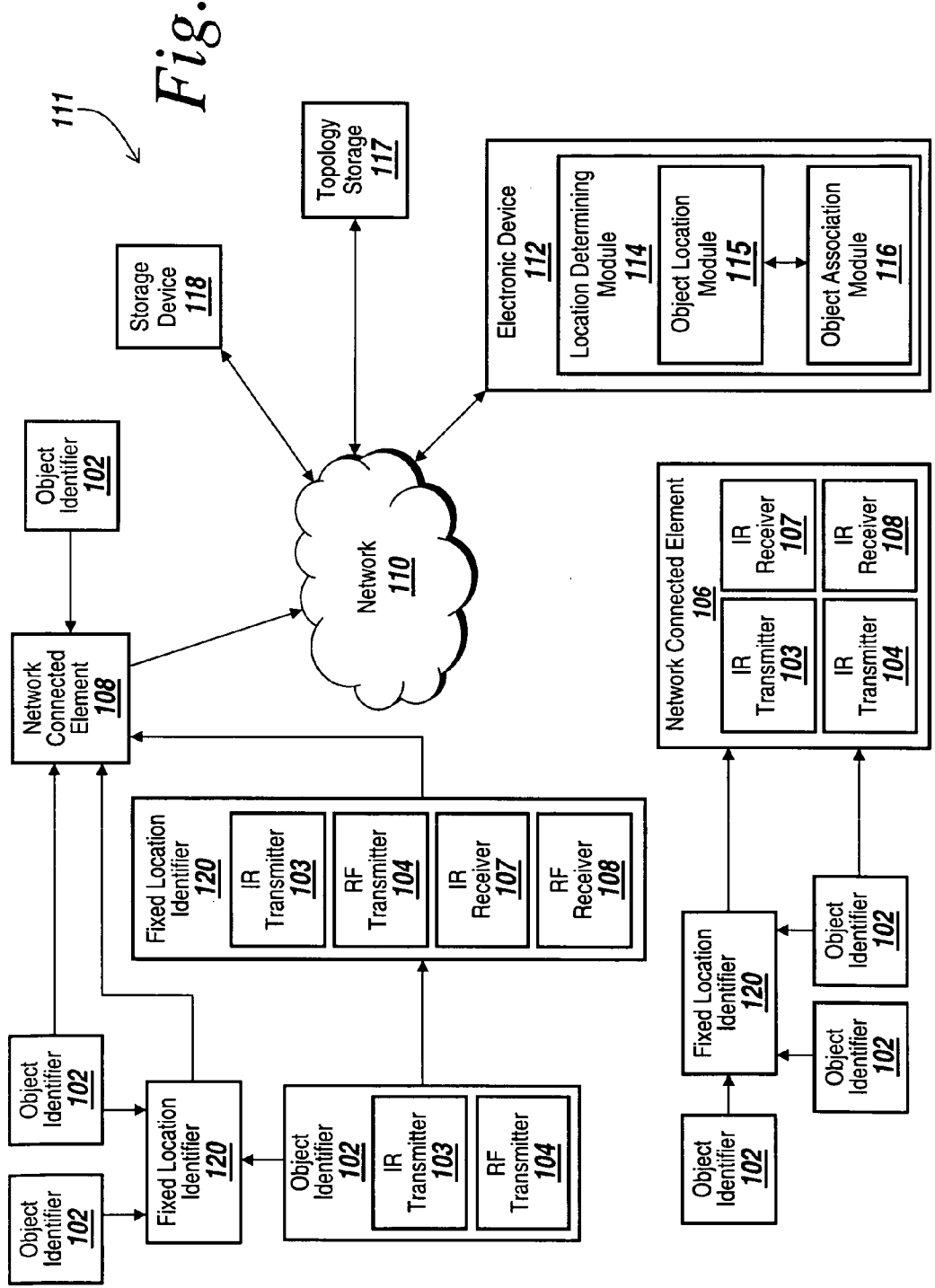
FIG. 1 illustrates an exemplary location system suitable for determining object locations and associations, in accordance with exemplary embodiments.

Exemplary embodiments provide systems and methods for detecting activities involving one or more objects and determining information associated with the detected activities.

Exemplary embodiments use one or more items of context information on one or more objects to detect or determine activities. Examples of detected activities/activity types include, but are not limited to, doctors and nurses making rounds, janitors cleaning rooms, surgeons performing surgery, nurses administering medication, phlebotomists drawing blood, technicians taking electrocardiograms (EKGs) on patients, telemetry patients ambulating, etc. Examples of context information include, but are not limited to, identities of objects, roles or activities associated with objects, locations/locales of objects, historical locations/locales of objects, associations between objects, duration of associations between objects, etc.

Upon detecting an activity, exemplary embodiments also determine information about the detected activity. Examples of activity information include, but are not limited to, the type of the activity, the identities and roles of the objects involved in the activity, the time of the activity, the duration of the activity, the primary location and/or locale of the activity, the primary location and/or locale of an object during the activity, etc. To make the activity information available for subsequent use, exemplary embodiments optionally store and/or display the detected activities and activity information about the activities.

Exemplary embodiments use activity information to analyze a detected activity, e.g. to determine if a detected activity is in compliance with established protocols, regulations or policies, or to determine that a step in a process is complete and ready for the next step. Exemplary embodiments also initiate an event in response to a detected activity, e.g. setting off a warning if a patient is left attached to a dialysis machine for too long, notifying a nurse manager that a previously dirty bed is now clean and ready for the next patient, etc.

As used herein, the term "activity" is intended to include any task, function, action, movement or the like, involving one or more objects and/or locales. Examples of activities/activity types include, but are not limited to, doctors and nurses making rounds, janitors cleaning rooms, surgeons performing surgery, nurses administering medication, phlebotomists drawing blood, technicians taking electrocardiograms (EKGs) on patients, telemetry patients ambulating, etc.

As used herein, the term "activity detection" is intended to include any process, method or technology for determining or detecting an activity.

As used herein, the term "activity information" is intended to include any information that is provided, inferred, implied, or otherwise calculated or determined in relation to an activity involving an object or a locale, such as the primary location or locale of an activity, the time of the activity, the time duration of the activity, the objects and/or locales involved in the activity or the like.

As used herein, the term "context information" or "context knowledge" is intended to include any information about an object or the context surrounding an object that is provided, inferred, implied, or otherwise calculated or determined, such as background, location, locale, role, identity, circumstances or the like.

As used herein, the term "object" is intended to include any portable or non-portable item or thing of any size, shape or dimension, a person, an entity, or a mammal or non-mammal that can be used or associated with an object identifier as provided by exemplary embodiments.

As used herein, the term "role" is intended to include any label assigned to an object reflective of a task or function performed by the object. Examples of roles in a hospital setting include, but are not limited to, surgeon, janitor, nurse, orderly, etc.

As used herein, the term "location system" is intended to refer to any system that is used to determine and track the locations of objects. Such systems may use any number or combination of technologies including, but not limited to, bar-coding, magnetic encoding, transmitters, and transponders.

As used herein, the term "location" is intended to include an identification of a point in space, e.g. using spatial coordinates. As used herein, the term "locale" is intended to include any area, site, location or point of interest. For example, hospitals have several types of specialty purpose rooms such as patient rooms, emergency rooms, operating rooms, intensive care rooms, quarantine rooms, laboratories, equipment rooms, etc. Each of these rooms can constitute a locale within the hospital. Indeed, such locales are typically the level of granularity for locations that hospitals typically work with. For example, patients are assigned to rooms, samples are sent to laboratories, and doctors schedule the use of operating rooms.

Although many of the examples listed herein have been made with reference to a hospital environment, exemplary embodiments can be used to detect activities and determine activity information in any environment and industry.

II. Determination of Locations and Associations

There is a need to automatically and accurately track the amount of time a person or object spends interacting or associating with other people or objects. Such association information may be used for accounting purposes, e.g. for worker payroll, to bill a customer, or to log the "work expended" on a given object or by a given person. The information may also be used for inventory records, equipment utilization studies, event precipitation and similar uses.

Conventional object association systems are not sufficiently accurate, partly because such systems use estimates to determine the amount of time devices spend interacting. For example, it is quite common for such systems to estimate the amount of time that an expensive piece of medical equipment is used during a procedure. Since medical equipment can generate millions of dollars a year in bills for small periods of use, a small inaccuracy in the estimated time of use can have a large impact on the bill charged to the payer. Accordingly, it is becoming common for medical insurance companies to demand exact time recordings of the usage of particular equipment. Since exact time recordings require human oversight, it becomes burdensome for medical staff to track object associations and their durations.

Conventional object association systems rely on humans to input data, which makes the systems prone to error and to people "gaming" the system. For example, conventional systems are not designed to determine and log associations automatically without human intervention. The need for humans to initiate conventional association systems represents a major difficulty with these systems. This requirement for manual interaction, typically to record that a task is complete, start and stop timers or record times, results in inaccurate readings that can be subject to fraud. Some users simply forget to record that a task is complete or start or stop the timers, especially when they have multiple tasks to perform. In addition, some users just estimate the time to keep things simple or because they are delayed in documenting their work. In most cases, uses of such systems do not stop the timers when they take small breaks, which further leads to inaccurate readings. In some cases, users start or stop the time tracking system fraudulently which also results in inaccurate billing. Additionally, accurately tracking the time that objects spend interacting is difficult in conventional systems since the objects, absent an interface with a timer, cannot themselves start a timer. A person typically needs to be involved in some way.

In addition, conventional object association systems fail to track multiple tasks, either sequentially or simultaneously. In "time clock" type systems, if there are multiple objects or tasks to be tracked, multiple timers are typically used. These timers can track when a human operator notes that two devices begin to interact, but the problem rapidly becomes too complex to record if there are multiple devices interacting with other devices. Conventional wireless tether systems are limited to noting when two devices are close to each other, but these systems are typically not equipped to handle multiple object interactions where starting and stopping is involved. These systems simply indicate that multiple devices are in the same space, but do not determine which objects are interacting or the times of these interactions.

Furthermore, most conventional systems do not have the ability to automatically and continuously track object interactions in order to make such information available in "real time" to an interested party, such as tracking the progress of a piece of work in process (WIP) and the time various tools and persons spend interacting with the piece of work. Without such an ability to review real-time object association data, supervisors or systems have difficulty in quickly recognizing problems in a production flow.

Sites where location systems and object association systems are used, such as hospitals, may be large and complex. This can make tracking resources within the sites a complicated task. As such, it may be useful to subdivide a site into locales of interest. As used herein, the term "locale" is intended to include any area, site, location or point of interest. For example, hospitals have several types of specialty purpose rooms such as patient rooms, emergency rooms, operating rooms, intensive care rooms, quarantine rooms, laboratories, equipment rooms, etc. Each of these rooms can constitute a locale within the hospital. Indeed, such locales are typically the level of granularity for locations that hospitals typically work with. For example, patients are assigned to rooms, samples are sent to laboratories, and doctors schedule the use of operating rooms. Associating an object or person with such a locale provides a convenient level of granularity for tracking resources as well as providing context for the calculated location of the object or person. For example, knowing a doctor is in an operating room may be more useful than knowing that the doctor is at coordinates X, Y, Z.

In many instances, an interaction between an object and another object may be inconsequential. For example, a doctor may pass within a close proximity of a patient on the way to treat another patient. If criteria for association were based solely on proximity, such passing proximity could be wrongly determined to be an association between the doctor and the patient even though the doctor had no actual interaction with the patient.

Likewise, limitations of the hardware used to determine locations may cause the location of an object or person to briefly change or may result in inconsistent locations. For example, a doctor may be in a first locale, such as a room, that is directly adjacent to a second locale, such as another room. If the doctor is standing against a wall in the first room that is adjacent to the second room, it is possible that the calculated location of the doctor may show that the doctor is suddenly in the second room and then back in the first room even though the doctor never actually changed rooms.

Most location system technologies are less than perfect at accurately reporting locations. There are errors and limitations on location resolution, and the reported location of an object can vary even if the object is stationary. Thus, it is necessary to account for such inaccuracies and variations when utilizing location data determined by location systems.

In both of the foregoing examples, the interaction of the doctor with a patient or locale was too brief for an actual interaction to occur, and therefore an association between the doctor and the patient or locale should not be formed.

Exemplary embodiments provide systems and methods for tracking, calculating and determining associations using a location system. As used herein, the term "location system" is intended to refer to any system that is used to determine and track the locations of objects. Such systems may use any number of technologies including, but not limited to, barcoding, magnetic encoding, transmitters, and transponders. Locations systems are often used at sites like warehouses, factories, and hospitals to track resources, such as equipment and personnel. For example, a location system can be used to track inventory in a warehouse. In a factory, a location system can be used to track parts during assembly and manufacturing. In a hospital, a location system can track equipment and personnel.

To overcome the limitations of conventional object association systems, exemplary embodiments determine associations between an object or person being tracked and other objects, persons, locations, or locales based on the time of interaction as well as the geographical proximity.

Location and association detection and tracking, enabled by exemplary embodiments, can be used to make patient care processes more efficient. In hospitals with high occupancy rates, the time required to turn over a bed can affect the number of patients that can be accommodated. In some cases, such hospitals may need to use diversion, i.e. redirection of patients to another hospital, which results in lost revenue. Thus, more patients can be accommodated and revenue can be increased by an ability to move patients through the care process more efficiently and getting patient rooms cleaned and readied for the next patient without delay.

In addition, location and association systems of exemplary embodiments allow improvements in patient care and satisfaction. For example, patients often need to wait for hours in the emergency departments of hospitals. Such long waits are often unavoidable, but seriously ill patients should not have to wait for appropriate emergency care. It has been shown that timely care can greatly improve the outcome of certain illnesses, e.g. strokes and heart attacks. Exemplary embodiments can be used to "watch" the care process and alert clinicians if recommended care is not delivered to a patient within a recommended time-frame. For example, a patient experiencing a stroke may need to have a brain scan performed to determine if the health issue is due to bleeding or a clot. If the issue is found to be caused by a cot, then a thrombolytic should be delivered. Outcomes are best when this entire process is completed within the first hour of symptoms. Exemplary embodiments can be used to monitor such care processes and to ensure that the processes are completed within their recommended time-frames. Exemplary embodiments can also be used to alert staff when a patient's care is not in compliance with a recommended care protocol, e.g. is taking more than the recommended time, or is not following the right sequence of steps, etc.

Location and association systems of exemplary embodiments will now be described in more detail. Exemplary embodiments provide a location system including an object identifier, a receiver and a location determining module. Locations of objects are determined in exemplary embodiments based on signals transmitted from object identifiers linked to the objects and forwarded to a location determining device. As used herein the term "link" is intended to mean that the object identifier is associated, coupled, connected or affixed or embedded, either directly or indirectly, to the object in any suitable manner. The origin of the signal is calculated based on several factors including, but not limited to, the known position of the receivers receiving the signal, the historical recorded position of the object, the characteristics of the receivers receiving the signal (e.g. the range), the strength of the received signal, the type of the signal, and whether the signal was repeated. Those of ordinary skill will be able to determine other methods of determining location that are consistent with the teachings of the present invention.

The object identifier of exemplary embodiments is attached to an object to be tracked. The object identifier provides a unique identifier that is used to identify and track the object to which the object identifier is attached. For example, an object identifier may be a transmitter, configured to transmit a signal including the unique identifier. The transmitted signal may be an infrared (IR), radio frequency (RF), ultrasonic (US), cellular, Bluetooth (BT), or any other wireless communication protocol, including any combination thereof. The object identifier may also use passive technologies like bar-coding, magnetic encoding, and passive radio-frequency identification (RFID), that require a reader to obtain the unique identifier.

The receiver of exemplary embodiments is configured to receive the unique identifier from the object. If the object identifier is a transmitter, the receiver may be a corresponding receiver configured to receive the type of signal transmitted by the object identifier. If the object identifier uses a passive technology, such as bar-coding or passive RFID, the receiver may have a bar-code or RFID reader.

The receiver is typically provided location information for the unique identifier. For example, the receiver may be placed at a known location so that if the receiver receives a unique identifier from an object identifier, it is an indication that the object identifier is in proximity to the known location of the receiver. In certain embodiments, there may be multiple receivers each at a separate known location. The receiver(s) may then transmit the unique identifier to the location determining module.

The location of an object is determined by a location determining module in exemplary embodiments. The location determining module uses the receipt of the unique identifier from the object identifier at the receiver(s) to determine the location of the object identifier (and object to which the object identifier is attached or embedded). The determination of the location of the object identifier may be based on a variety of factors including: the known location of the receiver(s) that received a unique identifier, the signal strength of a signal received at the receiver(s), the type of the signal, and historical location information for the object identifier. In an exemplary embodiment, the location determining module may be part of the receiver(s). In another exemplary embodiment, the location determining module may be a separate component.

Once the location of the object has been determined, the location determining module can determine associations and interactions between the located object and other objects or locales based on the amount of time the located object is in proximity to the other object or locale. This concept is discussed in U.S. patent Ser. No. 7/099,895B2, issued Aug. 29, 2006, which is herein incorporated by reference.

Once an association is determined, the association may be processed or stored along with the duration of the association. The identified association may then be leveraged in a number of ways by other applications interfaced with the network. For example, identified associations can be used in billing systems, inventory systems, asset management systems, and automatic event generation systems.

As used herein, the term "network" is intended to include, but is not limited to, a Local Area Network (LAN), a Wide Area Network (WAN), a metropolitan network, an intranet, the Internet, a satellite network, or some other type of network. Communication may be established with the network through a variety of connections including, but not limited to, standard telephone lines, LAN or WAN links (e.g., 802.11, T1, T3, 56 kb, X.25), broadband connections (e.g., ISDN, Frame Relay, ATM), wireless connections such as Bluetooth cellular, or Global System for Mobile communications (GSM), or some combination of any or all of the above. In order to interface with the network, a network interface may be provided. The network interface may be a FireWire interface, FlexRay interface, RS-232 interface, and may include a built-in network adapter, network interface card, Personal Computer Memory Card International Association (PCM-CIA) network card, card bus network adapter, wireless network adapter, USB network adapter, modem or any other suitable device.

FIG. 1 illustrates an exemplary location system 111 suitable for determining locations and associations, in accordance with exemplary embodiments. A plurality of object identifiers 102 linked to objects includes one or more transmitters which are used to generate a signal which is sent to a network connected element 106. The one or more transmitters may include a radio frequency (RF) transmitter, an infrared (IR) transmitter, an ultrasonic (US) transmitter, transceivers, or any combination thereof. In the exemplary location system of FIG. 1, the object identifiers 102 include one or more of an IR transmitter 103 and an RF transmitter 104. The transmitted signal may include a unique identifier identifying the object identifier and, by extension, the object to which it is linked.

The network connected element 106 may include one or more transmitting components as well as one or more receiving components. The one or more transmitting components may include one or more of a radio frequency (RF) transmitter, an infrared (IR) transmitter, an ultrasonic (US) transmitter, transceivers, or any combination thereof. The one or more receiving components may include one or more of a radio frequency (RF) receiver, an infrared (IR) receiver, an ultrasonic (US) receiver, a transceiver, or any combination thereof. In the exemplary location system of FIG. 1, the network connected element 106 includes one or more of an IR transmitter 103, an RF transmitter 104, an IR receiver 107 and an RF receiver 108. The IR receiver 107 is capable of receiving an IR signal generated by the object identifier 102. The RF receiver 108 is capable of receiving an RF signal generated by the object identifier 102.

The network connected element 106 is interfaced through a network interface with a network 110 and forwards the signal received from the object identifier 102 to an electronic device 112 which is also interfaced with the network 110. The interface between the network connected element 106 and the network 110 may be a physical interface in the case of a wired network, or a wireless interface in the case of a wireless network. Although the object identifier 102 and the network connected element 106 have been described as including IR and RF transmitters 103 and 104 and receivers 107 and 108, those skilled in the art will recognized that other configurations and receiver and transmitter combinations are possible, without departing from the scope of the present invention.

The electronic device 112 may include any electronic or computer system such as a workstation, desktop computer, server, web server, or laptop, a handheld device, sensor, actuator or other form of computing or telecommunications device that is capable of wireless or wired communication with the network 110, and that has sufficient processor power and memory capacity to perform the operations described herein. The electronic device 112 includes a location determining module 114 which is used to locate the object identifier 102 and the corresponding object to which the object identifier is linked.

In exemplary embodiments, the location determining module 114 includes any appropriate software and hardware for determining or deriving location information about an object, for tracking time that objects and/or locales interact with each other, and for forming associations between objects and/or locales.

The location determining module 114 includes an object location module 115 and an object association module 116. The object location module 115 is configured to determine the location of the object identifier and hence the object linked thereto based at least in part on data identifying the object provided by the object identifier 102.

The object location module 115 of the location determining module 114 calculates the origin of the signal using one or more factors including, but not limited to, the known position of the receivers receiving the signal as retrieved from a topology storage device 117 which is also interfaced with the network 110, historical recorded positions of the object, characteristics of the receivers receiving the signal (e.g. the range) which are retrieved from a storage device 118 also interfaced with the network, the strength of the received signal, the type of the signal, and whether the signal was repeated (which are determined by analyzing information contained in the signal received from the network connected element 106). This list of factors is not intended to be exhaustive and can include other known factors or methodologies as set forth below. Examples of suitable systems and/or methodologies for determining location that can be employed by the object location module 115 are described in U.S. Patent Publication No. 20020198986 and U.S. Pat. Nos. 7,053,831; 7,099,895, assigned to the assignee hereof, and the contents of which are incorporated herein by reference. Other suitable location determining systems and/or methodologies that can be employed in exemplary embodiments include active and passive RFID systems, bar-code systems, magnetic cards, fixed beacon-type systems, triangulation systems, time-of arrival and derivative time of arrival systems, and dead reckoning systems.

The location determining module 114 also includes an object association module 116, which according to an exemplary embodiment communicates with the object location module 115. The object association module 116 is programmed or configured to determine whether the object is in proximity to a second object or a locale for a time period greater than or equal to a threshold time, based on the location of the object received from the object location module 115. If the time period that the object is in proximity to the second object or locale is greater than or equal to the threshold time, the object association module 116 creates an association between the object and the second object or locale.

Although the location determining module 114 will usually be implemented as a software component, the location determining module 114 may also be implemented by being hardwired into a device.

The object identifier 102 may be directly or indirectly linked by any suitable fastening or joining mechanism to the object. For example, the object identifier 102 may be directly linked to a person who is wearing it as a medical bracelet. Alternatively, the object identifier 102 may be indirectly linked, such as by being embedded in a name tag which is fastened to clothing. As long as it travels with its linked object, the object identifier 102 can identify the location of the linked object.

The location determining module 114 uses the unique identifier to calculate the current location of the object identifier 102. Once the location of the object identifier 102 is calculated or determined, the location of the object may be analyzed to determine associations with other objects or locales. The process of analyzing the calculated location of the object identifier 102 will now be described in more detail. Any identified associations may be stored in the storage device 118.

The topology storage device 117 also interfaces with the network 110. The topology storage device 117 stores topology data used by the location determining module 114 to determine the location of the object identifier 102. The topology data may include data of any suitable type, such as floor plans for the site or locale of the location system 111 and/or the locations of the network connected element 106 and/or the fixed location identifier 120 that may be deployed at the site. Using this information, the location determining module 114 is able to determine the location of the object identifier 102 (as well as network connected element 106 and fixed location identifier 120) in relation to known structural features of the site (e.g. floors, wards, hallways, rooms, and the like).

In an exemplary embodiment, a fixed location identifier 120 is also present in the location system. The fixed location identifier 120 may include one or more transmitters as well as one or more receivers. The transmitters may include one or more RF, IR, US transmitters, transceivers, or any combination thereof. The receiver can include one or more RF, IR, or US receivers, or any combination thereof. As illustrated in FIG. 1, the fixed location identifier 120 can include an IR transmitter 103, an RF transmitter 104, an IR receiver 107 and an RF receiver 109. The IR receiver 107 is capable of receiving an IR signal generated by the object identifier 102, while the RF receiver 108 is capable of receiving an RF signal generated by the object identifier 102. The location of the fixed location identifier 120 is stored in the topology storage device 117.

After receiving a signal from the object identifier 102, the fixed location identifier 120 appends its own identifier (unique or non-unique) to the signal and transmits the signal to the network connected element 106. When the signal eventually reaches the location determining module 114, the location determining module may use characteristics of the fixed location identifier 120 (such as location and range) to help determine the location of the object identifier 102. For example, if the location determining module 114 receives notification from both a fixed location identifier 120 and a network connected element 106 that both received an RF signal, the signal could only have originated from a location that is within the range of both receivers. Those skilled in the art will recognize that many alternate implementations are possible within the scope of the present invention.

Figure 2:
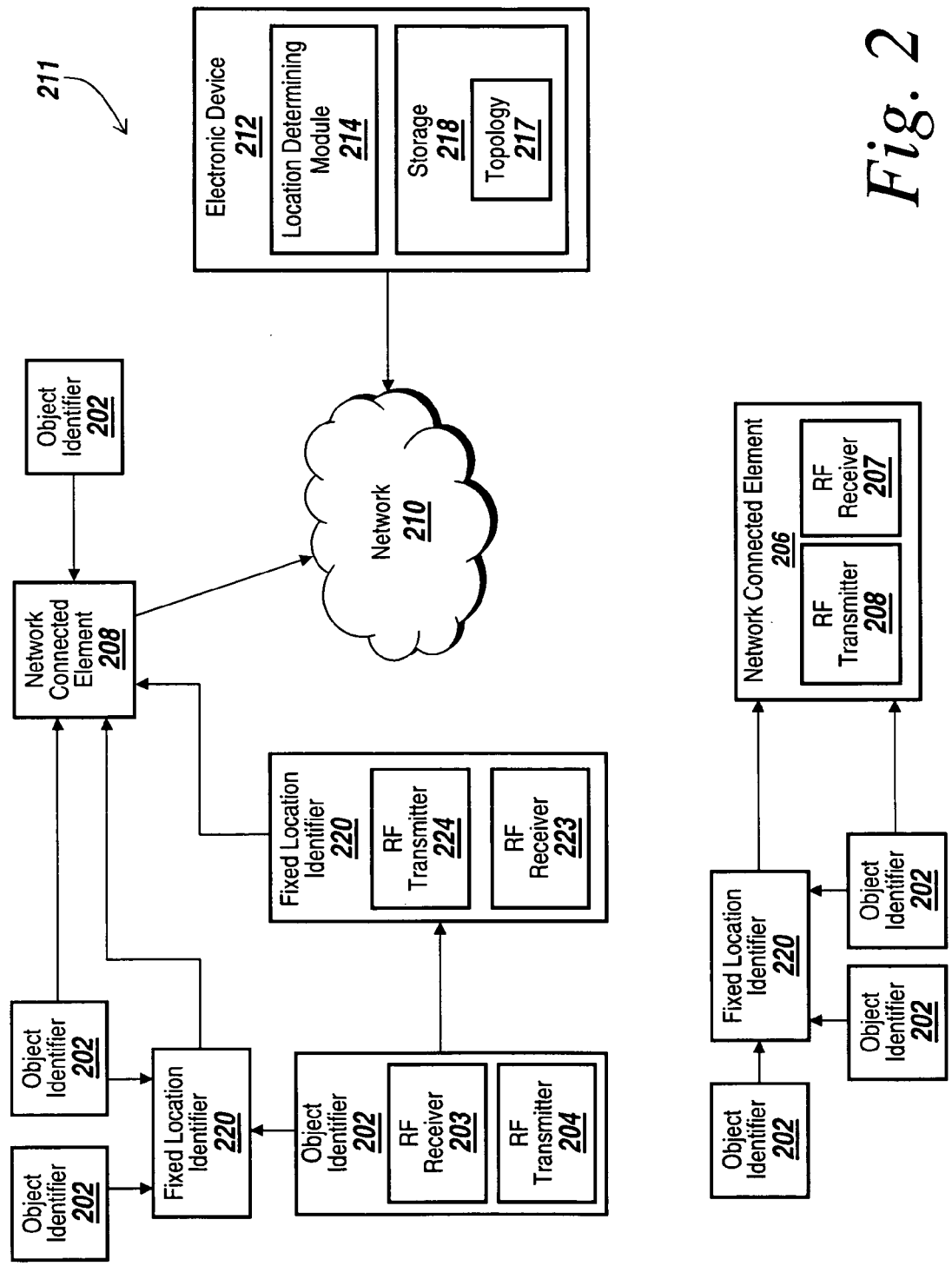
FIG. 2 illustrates an exemplary location system suitable for determining object locations and associations implemented using a radio frequency identification (RFID) configuration, in accordance with exemplary embodiments.

FIG. 2 illustrates an exemplary location system 211 implemented using a radio frequency identification (RFID) configuration, in accordance with exemplary embodiments. Similar to FIG. 1, the system 211 includes a plurality of object identifiers 202 linked to objects, one or more network connected elements 206, a network 210, an electronic device 212 that includes the storage device 218, the topology storage device 217, and the location determining module 214, and one or more fixed location identifiers 220. In this exemplary embodiment, the object identifiers 202 are configured as passive RFID tags which include an RF receiver 203 and a RF transmitter 204, although the identifiers can also be configured as active RFID tags. Likewise, the network connected elements 206 and fixed location identifiers 220 also include RF receivers 207, 223 and RF transmitters 208, 224.

In operation, the one or more object identifiers 202 are queried by a signal sent from the RF transmitter 208, 224 of a network connected element 206 or a fixed location identifier 220 and received by the RF receiver 203 of the object identifier 202. Because the one or more object identifiers 202 are configured as passive RFID tags, the signal received at the object identifier 202 serves to power the object identifier 202, which in turn generates and transmits a response signal including a unique identifier from the RF transmitter 204. The transmitted response signal may then be received by the RF receivers 207, 223 of a network connected element 206 or fixed location identifier 220. The network connected element 206 is interfaced with a network 210 and forwards the signal received from the object identifier 202 to an electronic device 212 which is also interfaced with the network 210.

In the exemplary embodiment of FIG. 2, the electronic device 212 operates in much the same manner as the electronic device 112 of FIG. 1 except that the storage device 218 for the location data is located on the electronic device 212. Suitable storage devices 218 include any device, component or system that can store digital or analog data, and may include, but is not limited to, memory drives such as hard drives and optical drives, Flash drives, optical media (CDS, DVDs, etc.), EPROM, EEPROM, USB drives or storage elements, RAM, ROM, database software and hardware, removable storage and secondary storage devices, or other suitable storage mediums. In this embodiment, the storage device 218 also includes the topology storage device 217 or information associated therewith.

The location determining module 214 is used to locate the object identifier 202 and the corresponding object to which the object identifier is linked. The location determining module 214 operates in the same manner as the location determining module 114 of FIG. 1. The location determining module 214 uses the unique identifier to calculate the current location of the object identifier 202. The location determining module 214 calculates the origin of the signal using a variety of factors including the known position of the receivers receiving the signal, which is retrieved from topology data 217, the historical recorded positions of the object, characteristics of the receivers receiving the signal (e.g. the range) which are retrieved from storage device 218, the strength of the received signal, the type of the signal, and whether the signal was repeated which is determined by analyzing information contained in the signal received from the network connected element 206.

Once a calculation or determination of the location of the object identifier 202 has been made, the location of the object may be analyzed to determine associations with one or more other objects or locales. The process of analyzing the calculated location of the object identifiers is described in more detail below. Any identified associations may be stored in the storage device 218.

The network connected elements 206 and fixed location identifier 220 of FIG. 2 operate similar to the network connected elements 106 and fixed location identifier 120 of FIG. 1. Both devices 206, 220 are configured to query the object identifier 202, receive a response signal sent from the object identifier 202 in response to the query signal, and pass the information including the unique identification from the received signal to the location determining module 214. The fixed location identifier 220 and the network connected element 206 may also add information to the information present in the received signal. When the signal eventually reaches the location determining module 214, the location determining module 214 may use the information added by the fixed location identifier 220 and the network connected element 206 to help locate the object identifier 202.

Figure 3:
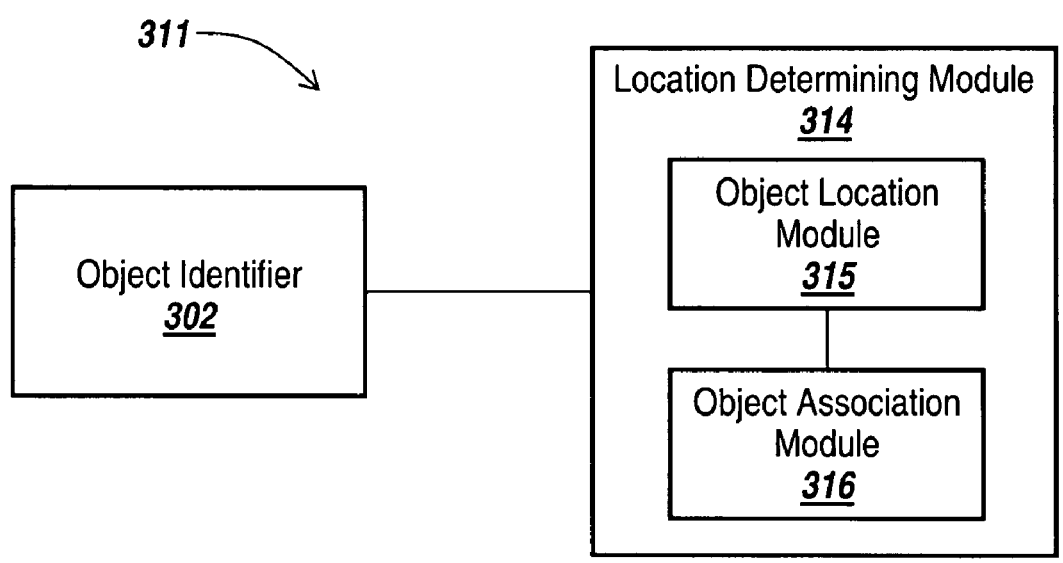
FIG. 3 illustrates an exemplary location system suitable for determining object locations and associations without relying on the use of a network, in accordance with exemplary embodiments.

A non-networked form of exemplary embodiments may also be implemented. FIG. 3 illustrates an exemplary location system 311 suitable for determining object associations without relying on the use of a network, in accordance with exemplary embodiments. The system 311 includes an object identifier 302 linked with an object and a location determining module 314.

The object identifier 302 provides data which identifies the object to the determining module 314. The object identifier 302 may transmit a signal including the identifying data using a transmitting component to transmit a signal. The transmitting component may be a transmitter, transceiver, transponder or similar device. In some exemplary embodiments, the data identifying the object may provided by a passive technology such as RFID, bar-coding, or magnetic encoding which require a reader to obtain the identifying data.

The location determining module 314 illustrated herein includes an object location module 315 and an object association module 316, as set forth above. The object location module 315 is programmed or configured to determine the location of the object identifier 302 based at least in part on data identifying the object provided by the object identifier 302.

The object association module 316 is programmed or configured to determine based on the location of the object, as determined by the object location module 315, whether the object is in proximity to a second object or a locale for a time period greater than or equal to a threshold time. If the time period that the object is in proximity to the second object or the locale is greater than or equal to the threshold time, the object association module 316 creates an association between the object and the second object or the locale.

The location determining module 314, including the object location module 315 and the object association module 316, may include any structure suitable for determining location, keeping track of time, and forming associations. Examples of such structures may include any device capable of determining the location of one or more object identifiers, keeping track of time, and forming associations based on proximity and time.

According to various embodiments of the invention, the location determining module 314 may be an electronic device. The electronic device may take multiple forms and may include a processor, a computer, a personal digital assistant, a communications device, such as a cell phone, a network appliance, a web server, a network, any device capable of manipulating information, a receiver, a transmitter, an interface or any combination of these devices. Further, those of ordinary skill in the art will recognize that the location determining module 314 can be integrated into different parts of the location system 311. For example, the location determining module can form part of a network connected element, a fixed location identifier, an object identifier, or can be separate from and/or remotely located from the other system components.

According to various embodiments of the invention, the location determining module 314 may be capable of performing additional functionality, such as receiving requests for information, providing information, storing information, commanding actions in response to location information, associating objects with other objects or with locations, establishing privacy conditions regarding availability of location information, interfacing directly with various network types, and the like. According to further embodiments of the invention, the location determining module 314 includes multiple, distributed receivers or readers, some of which may be connected to a network, and others not connected to a network. According to various embodiments of the invention, the object identifier 310 and location determining module 314 utilize RF signals for the determination of location.

Those skilled in the art will recognize that different types of components capable of transmitting and receiving signals may be used in place of the illustrated transmitters and receivers depicted herein. For example, a transceiver may be substituted for a receiver without departing from the scope of the present invention.

Figure 4A:
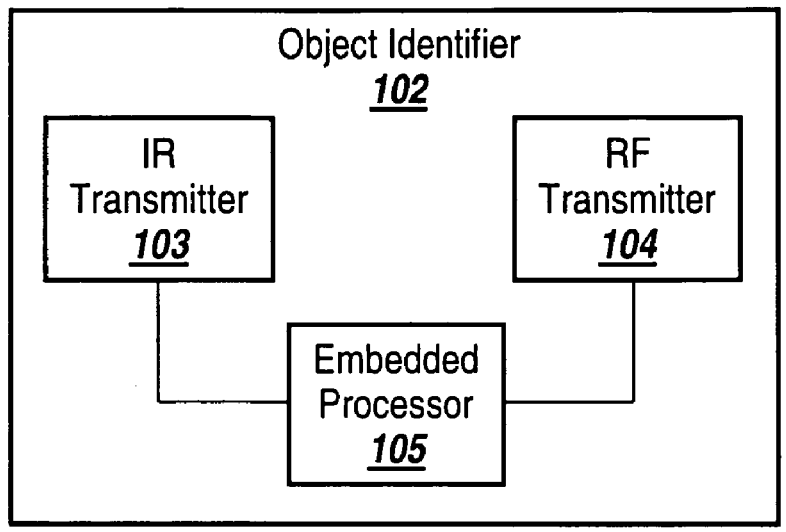
FIG. 4A illustrates an exemplary object identifier similar to the one used, for example, in FIG. 1.
Figure 4B:
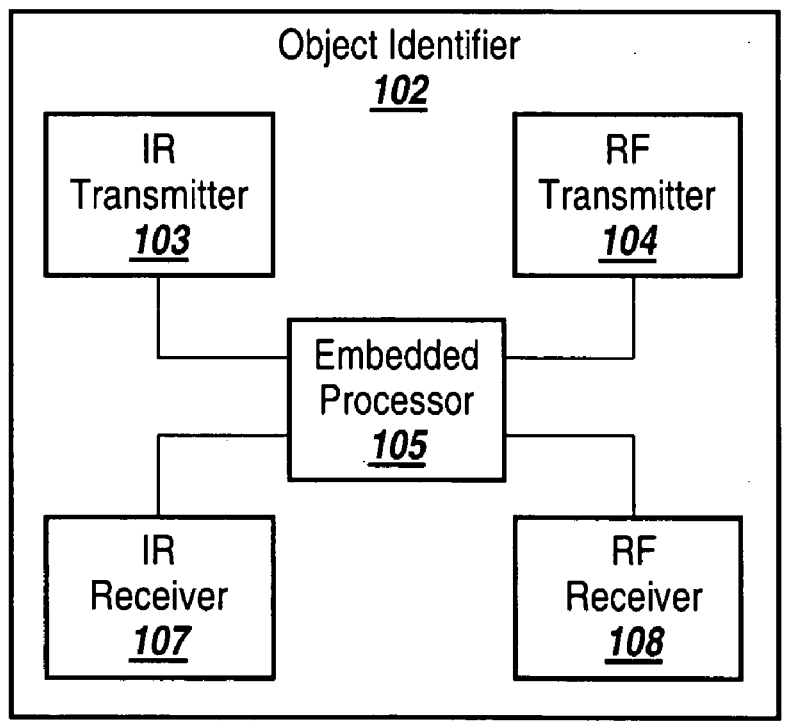
FIG. 4B illustrates an exemplary fixed location identifier similar to the one used, for example, in FIG. 1.

FIG. 4A illustrates an exemplary object identifier, similar to the one used, for example, in FIG. 1. As illustrated, the object identifier 102 includes an IR transmitter 103 and an RF transmitter 104. Both transmitters are controlled by an embedded processor 105 which controls the signaling process. Similarly, FIG. 4B illustrates an exemplary fixed location identifier 120 used for example in FIG. 1. The fixed location identifier 120 includes an IR transmitter 103 and an RF transmitter 104 which are controlled by an embedded processor 105 which controls the signaling process. Also included in the fixed location identifier 120 are an IR receiver 107 and an RF receiver 109 which are used to receive signals from the object identifier 102.

The signaling process may employ both RF and IR signals in alternating combination. According to one embodiment of the invention, the RF signal is transmitted every ten seconds and the IR signal is transmitted every twenty seconds. This method provides a substantially consistent IR power level, while varying an RF power level. Varying the RF power level may assist in determining a location of the object identifier 102 by enabling the network connected element 106 to receive less than all of the RF signals. The transmitted signals may also include additional information such as the signal strength being transmitted, the period between transmissions, the length of time of the transmissions, a unique identifier for the object identifier 102, information received from one or more input devices and/or various status information, such as those pertaining to the components of the object identifier. In one aspect of the invention, the object identifier 102 also contains receivers and the location determining module 114 configures the object identifier over the network 10 by sending transmission parameters (i.e.: alternate signals every 30 seconds). Since IR signals are line-of-sight signals and RF signals travel through walls, the combination of signals may be used by the illustrative embodiment of the present invention to locate signals with greater accuracy than would be possible using either form of signaling alone.

Figure 4C:
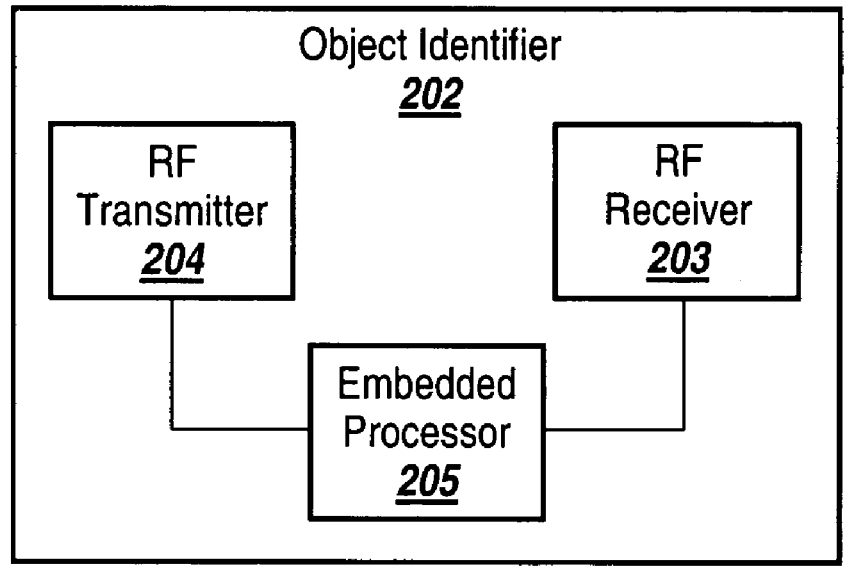
FIG. 4C illustrates an exemplary object identifier similar to the one used, for example, in FIG. 2.
Figure 4D:
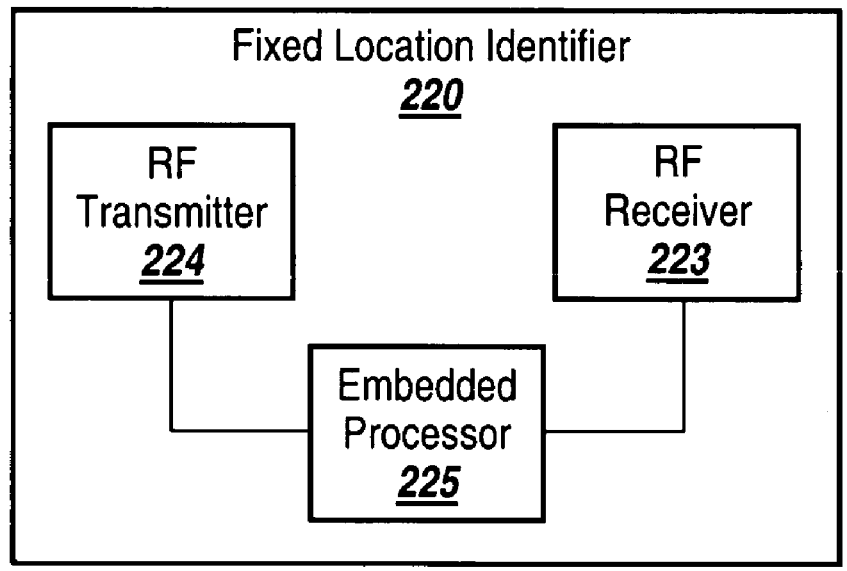
FIG. 4D illustrates an exemplary fixed location identifier similar to the one used, for example, in FIG. 2.

FIG. 4C illustrates an exemplary object identifier 202 used, for example, in FIG. 2. Accordingly, the object identifier 202 includes an RF receiver 203 and an RF transmitter 204. Both the receiver 203 and transmitter 204 are controlled by an embedded processor 205 which controls the signaling process. Similarly, FIG. 4D illustrates an exemplary fixed location identifier 220 used, for example, in FIG. 2. The fixed location identifier 220 includes an RF receiver 223 and an RF transmitter 224 which are controlled by an embedded processor 225 which controls the signaling process.

As discussed previously in regard to FIG. 2, the object identifier 202 is configured as a passive RFID tag. As such, the RF transmitter 204 and embedded processor 205 of the object identifier rely on the power provided by an RF signal from the RF transmitter 224 of the fixed location identifier 220. In operation, the embedded processor of the fixed location identifier 220 directs the RF transmitter 224 to send a query signal. The query signal is received by the RF receiver 203 of the object identifier 202 and energizes the embedded processor 205 and RF transmitter 204. The embedded processor 205 interprets the query signal and directs the RF transmitter 203 to transmit a response signal providing a unique identifier. The response signal is received at the RF receiver 223 of the fixed location identifier 220 and processed by the embedded processor. The embedded processor 225 may then append additional information to the information of the response signal and direct the RF transmitter 224 to transmit a signal including the information from the response signal and the additional information.

The advantage of such passive RFID design is that it does not require a power source on the object identifier 202. This also reduces the build cost of the object identifier 202. Those of ordinary skill will recognize that the object identifiers can also be constructed as active RFID tags, if desired.

Figure 5:
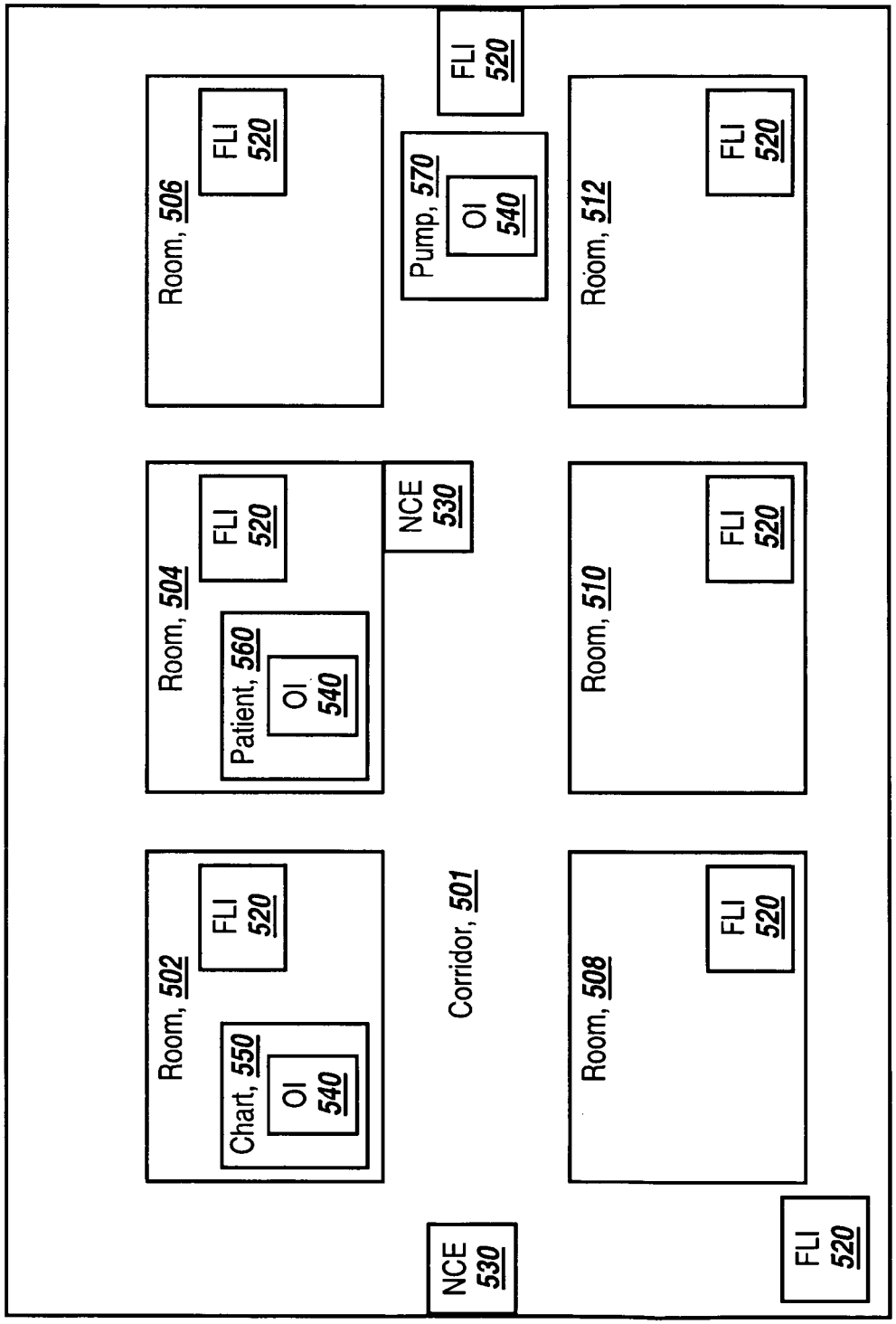
FIG. 5 illustrates an exemplary layout of a hospital for determining locations and associations in accordance with exemplary embodiments.

FIG. 5 illustrates an exemplary layout of a hospital 500 for determining locations and associations according to exemplary embodiments. The hospital lay-out can be pre-stored in the topology storage device 117. The hospital 500 includes a plurality of rooms 502, 504, 506, 508, 510 and 512 which may also be considered locales. Each of the rooms 502, 504, 506, 508, 510 and 512 has a fixed location identifier (FLI) 520 within the room. A corridor 501 has an additional fixed location identifier 520 at one end of the corridor and a couple of network connected elements (NCE) 530 located in the middle of the corridor and end of the corridor. The fixed location identifiers 520 and network connected elements 530 may be any of the implementations previously discussed, such as those in FIGS. 1 and 2, or any number of other implementations. As previously noted, the network to which the network connected element 530 is connected may be a wired or wireless network with the result that the network connected element 530 may or may not be physically connected to the network. The illustrative embodiment of the present invention is designed to execute over pre-existing networks and does not require the creation of a proprietary network. The hospital includes a plurality of objects to which object identifier's (OI) 540 have been linked. One room 502 includes a patient chart 550 with an object identifier 540 attached to the chart so that it will not be misplaced and may be quickly retrieved. Another room 504 includes a patient 560 who is wearing an object identifier 540 either attached to a piece of clothing or as a bracelet. The object identifier 540 attached to the patient 560 allows the patient's movements to be tracked throughout the hospital. Out in the corridor 501, an object identifier 540 is linked to an infusion pump 570. The object identifier 540 allows quick location of the infusion pump 570 in the event another unit of the hospital borrows the pump in an emergency without time to inform the proper people working in the hospital unit to which the pump is assigned. The object identifiers 540 may be any of the implementations previously discussed, such as those in FIGS. 1 and 2, or any number of other implementations.

The use of the network connected elements 530 and the fixed location identifiers 520 may be illustrated with an example. The object identifier 540 linked to the infusion pump 570 may be configured to emit one or more signals bearing a unique identifier. If the infusion pump 570 is located in a corridor 501, an RF signal transmitted by the object identifier is received by the receivers located in the fixed location identifiers 520 in a number of rooms 504, 506, 510 and 512 as well as the fixed location identifier 520 at the end of the corridor nearest to the pump. Additionally, the signal may also be received by the network connected element 530 located outside room 504. If the object identifier 540 linked to the infusion pump 570 also transmits an IR signal, it is only received by the fixed location identifier 520 located at the end of the corridor 501 and the network connected element 530 located outside room 504, since IR signals are line-of-sight signals. Since line-of-sight signals do not travel through most walls, they are unlikely to be received by an IR receiver located within one of the hospital rooms 502, 504, 506, 508, 510 and 512. The network connected element 530 located outside room 504 and the fixed location identifier 520 located at the end of the corridor 501 report receiving both signals to the location determining module (not shown). The location determining module uses the known location of both the network connected element 530 outside room 504 and the fixed location identifier 520 at the end of the corridor 501 to determine location. If both the network connected element 530 and fixed location identifier 520 are configured to received both types of signals, it can be determined that the infusion pump 570 must be in the corridor 510. Furthermore, since the fixed location identifier 520 may have a smaller receiving range for RF signals than the network connected element 530, it may be determined that the infusion pump 570 is located not only in the corridor but within range of the RF receiver on the fixed location identifier 520. Alternately, signal strength may be used in determining proximity to a receiver. The receiving ranges of the RF receivers and transmission strength of RF transmitters are an implementation choice, and those skilled in the art will recognize that they may be adjusted without departing from the scope of the present invention.

Once the location determining module has determined the current location or locale of an object to which an object identifier 540 is linked, the location is compared against the current location of other objects or locales to determine the proximity of the located object to the other objects or locales. The pre-determined location is usually a place of special interest such as a bed. The locale, in for example a hospital environment, may be a room. If the object is within a pre-defined distance of another object or locale the location determining module determines that the two objects or the object and the locale are interacting, and records an association in the storage device. Those of ordinary skill will readily recognize that the proximity or distance relationship of one object or locale with another object or locale can be vary based upon user requirements or needs. The appropriate proximity or distance can be pre-selected or predetermined, or can be derived, calculated or determined in real time. Those of ordinary skill will be readily able to determine the appropriate proximity based upon one or more factors, including but not limited to the type of object, the status of the object, locale, previous interactions or associations, the environment in which the system is used, and/or user requirements or specifications.

The location determining module may require the association to occur for a minimum or threshold period of time before deciding an association is occurring. This helps prevent false associations. The threshold period of time can be pre-selected or predetermined, and hence stored, in the system 111. Threshold times may be calculated, derived or otherwise established based on one or more factors including, but not limited to, user input, system specifications, the type of object, the status of the object, the locale, previous interactions or associations, the environment in which the system is used, user requirements or specifications, or the like. Moreover, the threshold time can also be calculated or determined in real time based upon one or more of the above listed parameters. Those of ordinary skill will also recognize that the threshold time value used to determine associations can vary as a function of one or more of the foregoing parameters. For example, the personnel, such as doctors, nurses, or janitorial staff may be able to interact with different objects and/or locales in different manners that take different amounts of time. For example, a nurse may be able to interact with a patient much quicker than a doctor. Therefore, the threshold time for associating a nurse with a patient may be smaller than a doctor's with the same patient.

Further, as set forth above, a doctor may pass within a close proximity of a patient on the way to treat another patient. If criteria for association were based solely on proximity, such passing proximity could be determined to be an association between the doctor and the patient even though the doctor had no actual interaction with the patient. Thus, a threshold value may be set as a minimum or threshold time limit that an object being tracked needs to be in proximity to another object or locale before an association is established. If the threshold value is not met, then an association is not established.

In another example, a doctor may be in a first locale, such as a room, that is directly adjacent to a second locale, such as another room. If the doctor is against a wall in the first room that is adjacent to the second room, it is possible that the calculated location of the doctor may show that the doctor is suddenly in the second room and then back in the first room due to inherent variations and/or inaccuracies in locating the doctor, even though the doctor never actually changed rooms. If the time the doctor is shown in the second room is less then that it would actually take for the doctor to physically move to the other room, it can be assumed that this change in locale is not an actual change.

For example, a graphical depiction of the doctor's position may look something like:

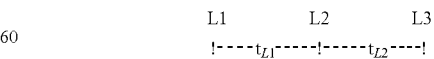

where "L1" is a first locale that corresponds for example to a first room, and "L2" is a second locale that corresponds for example to a second room. The term "$t_{L1}$" corresponds to the amount of time the doctor spends in the first room and the term "$t_{L2}$" corresponds to the amount of time the doctor spends in the second room. Here, the doctor is shown moving from the first room to the second room and back to the first room.

If the time "$t_{L1}$" is greater than or equal to the threshold time and "$t_{L2}$" is less than the threshold time then only an association with the first room is established. As discussed above, the threshold time may depend on the type of object being tracked and the locale it is being associated with. For example, nurses may move between rooms much more quickly than doctors, therefore the threshold times associated therewith may be smaller. The second room "L2" may also be located remotely from the first room "L1", necessitating significant travel time wherein the threshold time would be greater. For example, if the time "$t_{L2}$" is smaller than the time it takes to travel from the first room "L1" to the second room "L2" and back to the first room "L1". It can be assumed that the indication that the doctor was in the second room "L2" to be a false determination by the system.

The association is tracked for a beginning time, ending time, duration, and alternately for separate occurrences, all of which may be stored in the storage device. The electronic device stores, or is interfaced with, a variety of software programs to make use of the object associations determined by the location determining module.

Figure 6:
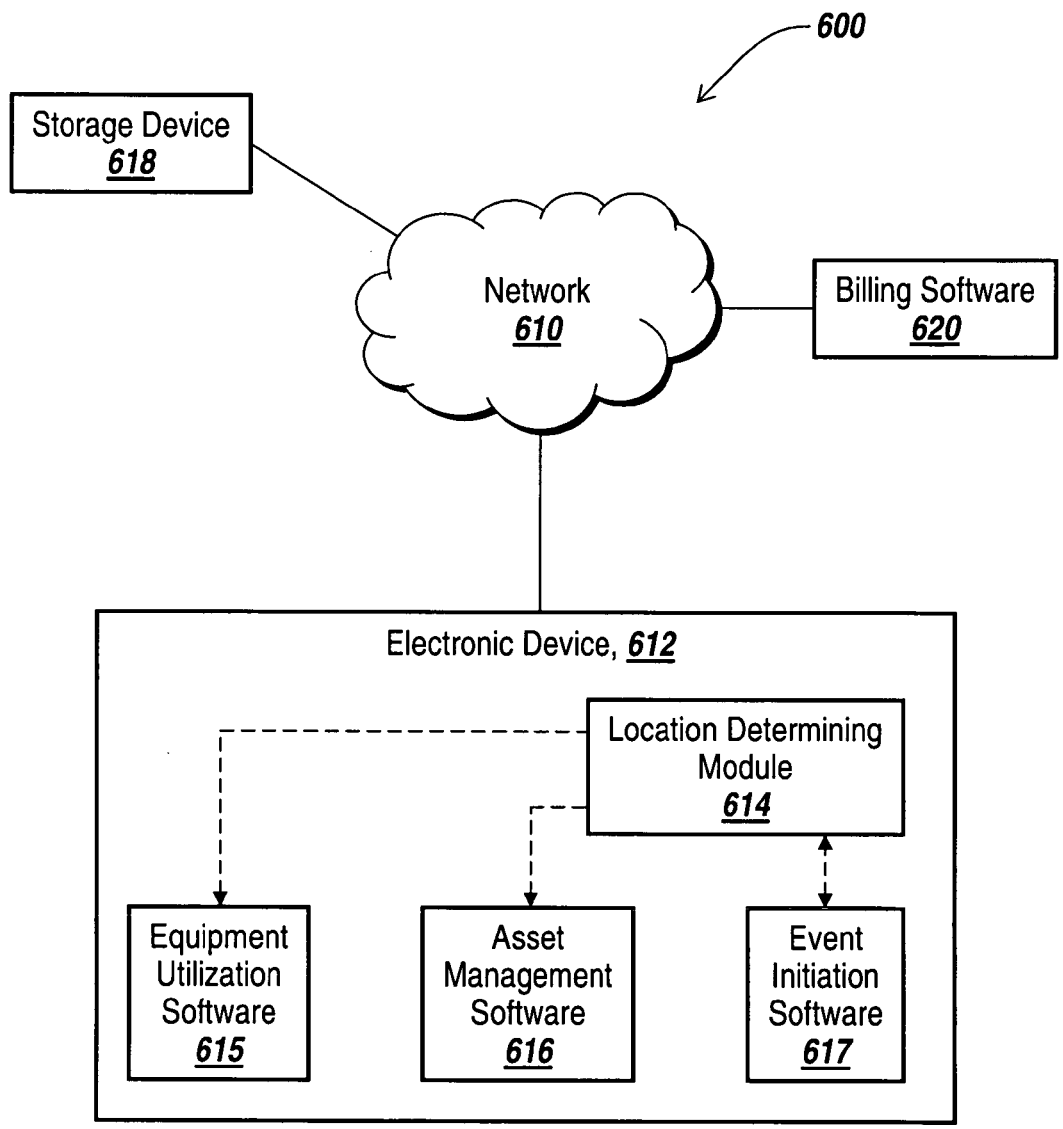
FIG. 6 illustrates an exemplary block diagram of exemplary components used to analyze associations determined in accordance with exemplary embodiments.

FIG. 6 illustrates a block diagram 600 of exemplary components used to analyze associations determined by the location determining module 614, in accordance with exemplary embodiments. The electronic device is similar in many respects to the electronic device illustrated in FIGS. 1 and 2. The location determining module 614 determines object associations and stores records of those associations in the storage device 618. A variety of software components or modules accessible to the location determining module 614 may be used to analyze the object associations. Equipment utilization software 615, asset management software 616 and event initiation software 617 are stored on the electronic device 612. Billing software 620 is interfaced with the network 610. Examples of the different types of software used to analyze object associations determined by the location determining module 614 are explored in more detail below. The software may utilize a JDBC interface located in the location determining module 614 which allows Java applications to send SQL commands to a database on the storage device 618. Those skilled in the art will recognize that the location and types of the various software components utilizing the object associations as input data may change without departing from the scope of the present invention. Those of ordinary skill will also recognize that the determination and/or storage of the object associations can occur at other locations in the illustrated system.

Figure 7:
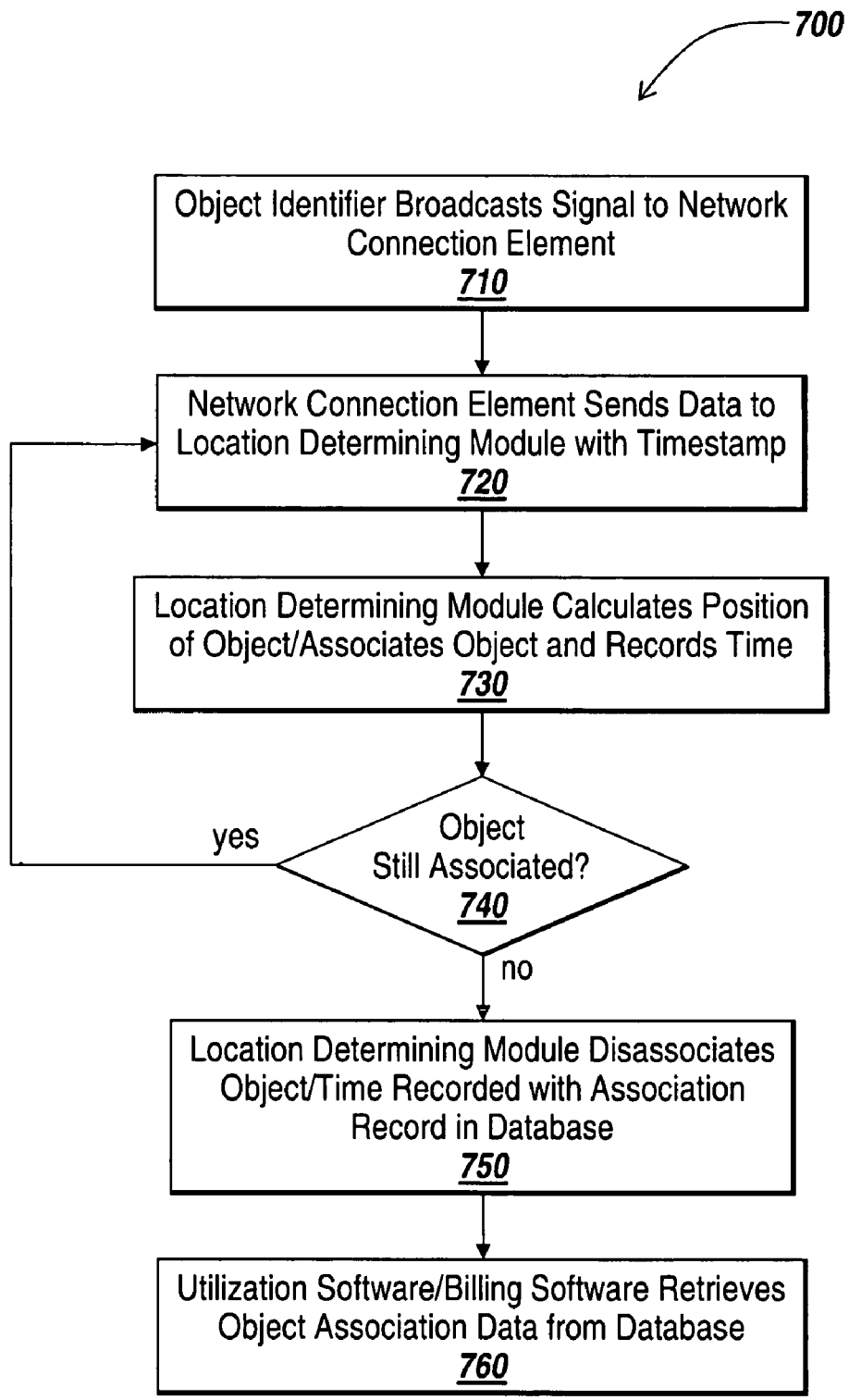
FIG. 7 illustrates an exemplary flowchart for determining object associations and using the object associations in equipment utilization and billing software modules, in accordance with exemplary embodiments.

Once the object associations have been determined by the location determining module 614, the association data may be provided as input data to a variety of software programs. FIG. 7 illustrates a flowchart 700 for determining object associations and using the object associations in equipment utilization and billing software modules 615 and 620, according to exemplary embodiments. An object identifier 102, 202, 302, 540 linked to an object broadcasts a signal to the network connected element 106, 206, 530 (step 710). In certain embodiments, such as shown in FIG. 2, the object identifier 202 may transmit the signal in response to a signal sent from the network connected element 206 or a fixed location identifier 120, 220, 520. The signal may be forwarded from a fixed location identifier 120, 220, 520 to the network connected element 106, 206, 530. The network connected element 106, 206, 530 appends information, such as a time stamp and its identifier, onto the signal and sends it to the electronic device 112, 212, and location determining module 114, 214, 314 (step 720). Alternatively, the location determining module 114, 214, 314 appends information, such as the time stamp and its identifier, onto the signal (step 720). The location determining module 114, 214, 314 calculates the location of the object as outlined above, associates the located object with another object and/or a locale and records the association and the time the association began in the storage device 118, 218, 618 (step 730). The network connected element 106, 206, 530 sends signals received from the object identifier 102, 202, 302, 540 and/or from the fixed location identifier 120, 220, 520 until the association is finished (step 740). Once the network connected element 106, 206, 530 stops sending signals, the location determining module 114, 214, 314, 614 disassociates the object in the storage device 118, 218, 618 and records the time the association ended (step 750). The storage device 118, 218, 618 stores the records of the association.

In an exemplary embodiment, the equipment utilization software or billing software 615 and 620 retrieves the records of the association from the storage device 118, 218, 618 (step 760). In another exemplary embodiment, the records of the association are sent directly from the location determining module 114, 214, 314, 614 to the equipment utilization software or billing software 615 and 620 (step 760).

The equipment utilization software 615 may use the data to analyze how often a portable x-ray machine is being used in a particular department of a hospital. Alternatively, the object association data may indicate how often a room is being utilized. Similarly, the billing software 620 may use the object association data to determine how much time a surgeon spent in an operating room with a patient in order to determine the amount to bill the patient.

The illustrative embodiment of the present invention may leverage the object association data in a number of ways. In one embodiment, the determined object associations are used to track the movements of a contagious patient in a health care facility. By mapping the calculated locations indicating the individual's path of travel, the health care facility is able to create a response based on which patients were probably exposed to the contagion. In another embodiment, the object identifiers may be linked to prescription drugs. For example, when a bag of intravenous drugs linked to an object identifier forms an association with a patient, a storage device may be consulted to prevent adverse reactions based on other drugs already received by the patient and/or the patient's personal medical history indicating allergies. In another embodiment, the object associations may be used to ensure compliance with the Health Insurance Portability and Accountability Act (HIPAA) which addresses the security and privacy of health data. By linking object identifiers 102, 202, 302, 540 to staff and the patient's chart, a record may be created indicating who viewed the chart.

Figure 8:
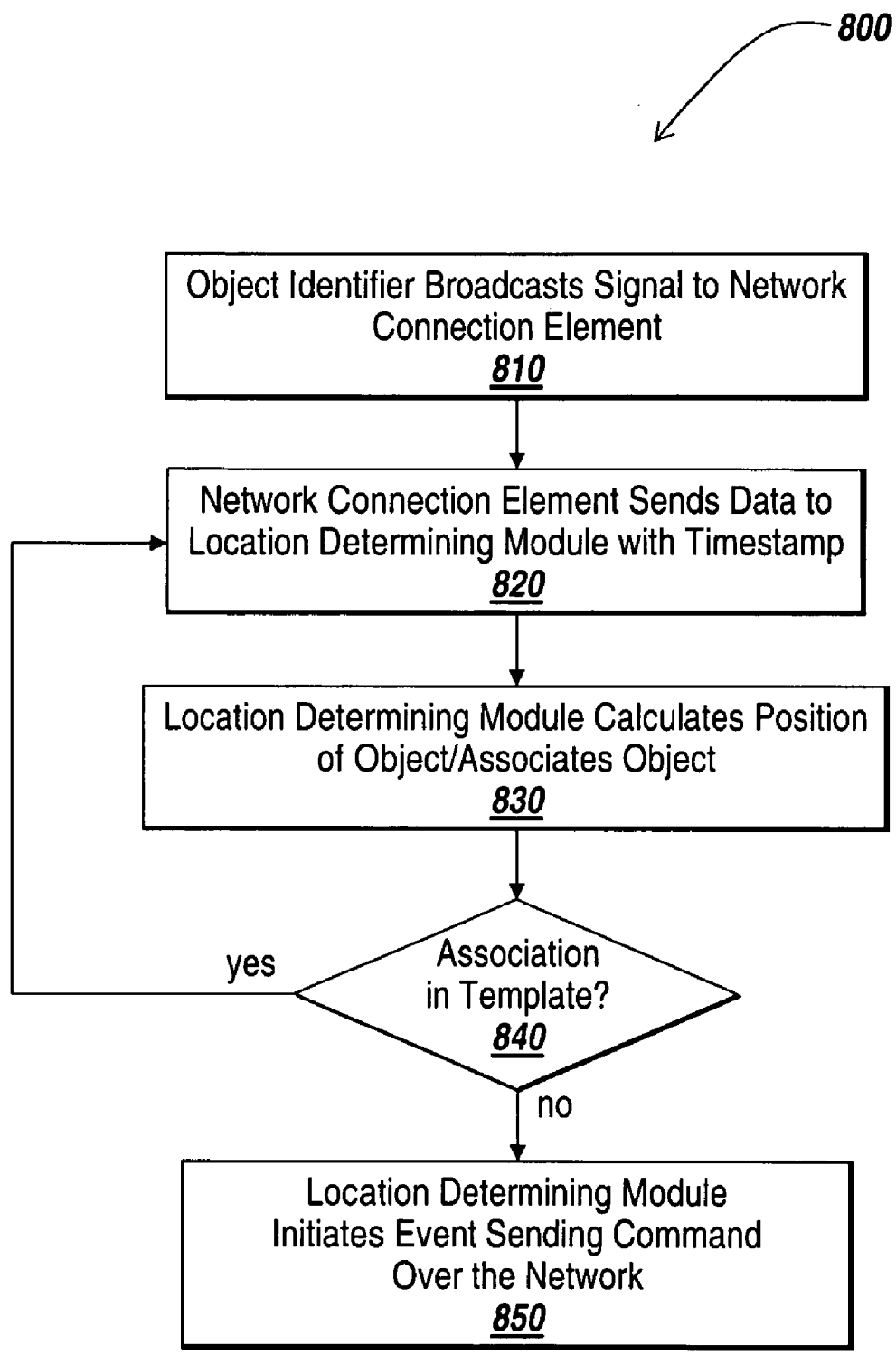
FIG. 8 is an exemplary flowchart for determining object associations and using the object associations in an event initiation software module, in accordance with exemplary embodiments.

The object association data stored in the storage device 18 may also be used for event initiation. FIG. 8 is a flowchart 800 for determining object associations and using the object associations in an event initiation software module 617, according to exemplary embodiments. The sequence begins when an object identifier 102, 202, 302, 540 linked to an object broadcasts a signal to the network connected element 106, 206, 530 (step 810). In certain embodiments, such as shown in FIG. 2, the object identifier 202 may transmit the signal in response to a signal sent from the network connected element 206 or a fixed location identifier 120, 220, 520. The signal may be forwarded from a fixed location identifier 20 to the network connected element 106, 206, 530. The network connected element 106, 206, 530 appends a time stamp and its identifier onto the signal and sends it to the electronic device 112, 212 and location determining module 114, 214, 314, 614 (step 820). The location determining module 114, 214, 314, 614 calculates the position of the object as outlined above, associates the located object with another object or a locale, and records the association in the storage device (step 830). The association may then be programmatically compared against a template of associations by the event initiation software 617 (step 840). For example, the event initiation software 617 may indicate that if a hospital patient object identifier associates with a corridor, an alarm should be sounded at the nursing station in the applicable hospital unit. Alternately, the event initiation software may indicate that if the object identifier embedded in the name badge of a company's CEO becomes associated with an entryway a greeting may be broadcast. If the association is listed in the template, instructions for the event are broadcast on the network 110, 210, 610 (step 850). Those skilled in the art will recognize that other forms of analyzing an object association besides a template may be used without departing from the scope of the present invention.

In one embodiment of the present invention, the object association data is utilized by the asset management software module 616. The asset management software module 616 may be used to provide a real-time inventory of assets owned by a company. The ability to quickly locate items may be of paramount importance in industries such as the health care industry, where a failure to locate an item quickly can result in catastrophic consequences. Additionally, the constant updating of asset locations may result in much lower costs during end of the year inventories. The frequency with which assets transmit their positions is configurable and may be based on how frequently the item is likely to move. For example, for larger machines that move infrequently, the transmitters may be set to signal once an hour or once a day. For smaller items, or items that are frequently being moved, the transmitters may be set to signal once a minute or once every 10 seconds in the case of an object identifier linked to a person. The real-time position of assets may then be broadcast on the network 110, 210, 610 and made available to authorized individuals. In another embodiment, an association may be formed between a bedridden patient and a bed. If it is determined that the association has stopped, an alert is sent over the network to a nurses station to indicate the possibility that the patient has fallen out of bed.

Figure 9:
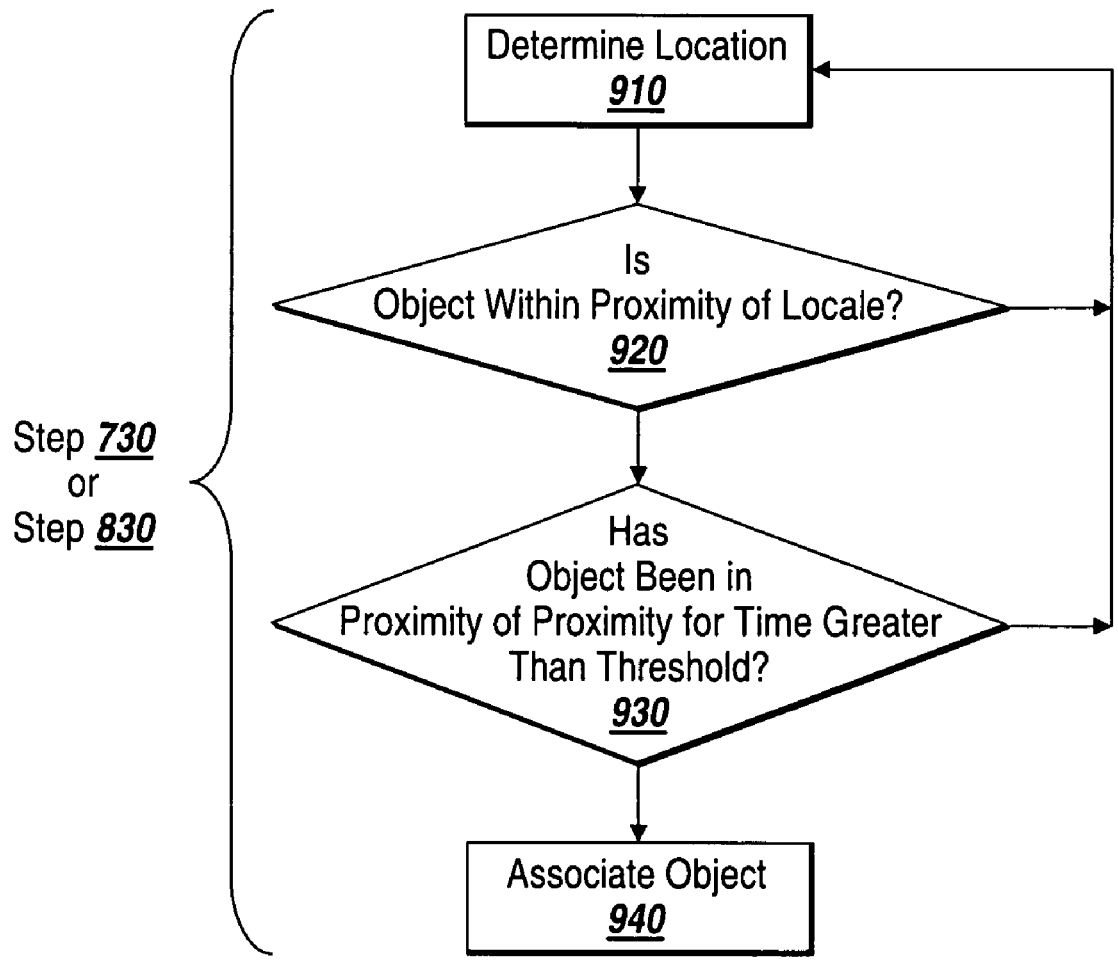
FIG. 9 is an exemplary flowchart of steps 730 and 830 of FIGS. 7 and 8, in accordance with exemplary embodiments.

FIG. 9 is an exemplary flowchart of the process performed in steps 730 and 830 of FIGS. 7 and 8 by the location determining module 114, 214, 314, 614 of the location system, in accordance with exemplary embodiments. The process begins with the determination of the location for the object to which the object identifier 102, 202, 302, 540 is linked (step 910). In certain embodiments, the determination of location (step 910) may be performed by an object location module 315 of the location determining module 314 as described in relation to FIGS. 1 and 3. Once the location of the object has been determined (step 910), the location information can be used to determine if the object is in proximity to another object or a locale (step 920). If the object is not in proximity to another object or locale, the location of the object is further monitored (step 910). However, if the object is in proximity to another object or a locale, then the time the object is in proximity with the other object or locale may be tracked (step 930). If the time the object is in proximity with another object or locale is less than a threshold time, then the location of the object is further monitored (step 910). However, if the time the object is in proximity with another object or locale is equal to or greater than a threshold time value, then an association for the object can be formed (step 940). The object association may then be used as discussed in relation to FIGS. 6-8.

Although many of the examples listed herein have been made with reference to a hospital environment, the illustrative embodiment of the present invention may be used to detect object associations in a variety of other environments. For example, the object association may take place in the setting of an airport where bags are associated with machinery designated to divert the bags to specific destinations. Alternatively, the object association may be used to verify that each checked bag is associated with a seated passenger before a plane takes off from an airport. The object association may be used to track the movements of products in a store or utilized at a check out register. The object association may be used to identify the effectiveness, or lack thereof, of advertising displays. Since the object association system is designed to work with components which utilize existing network topology, object associations may be determined in many different environments and the environments listed herein are intended merely as illustrative examples and not as an exhaustive list.

III. Exemplary Environment for Activity Detection

Figure 10:
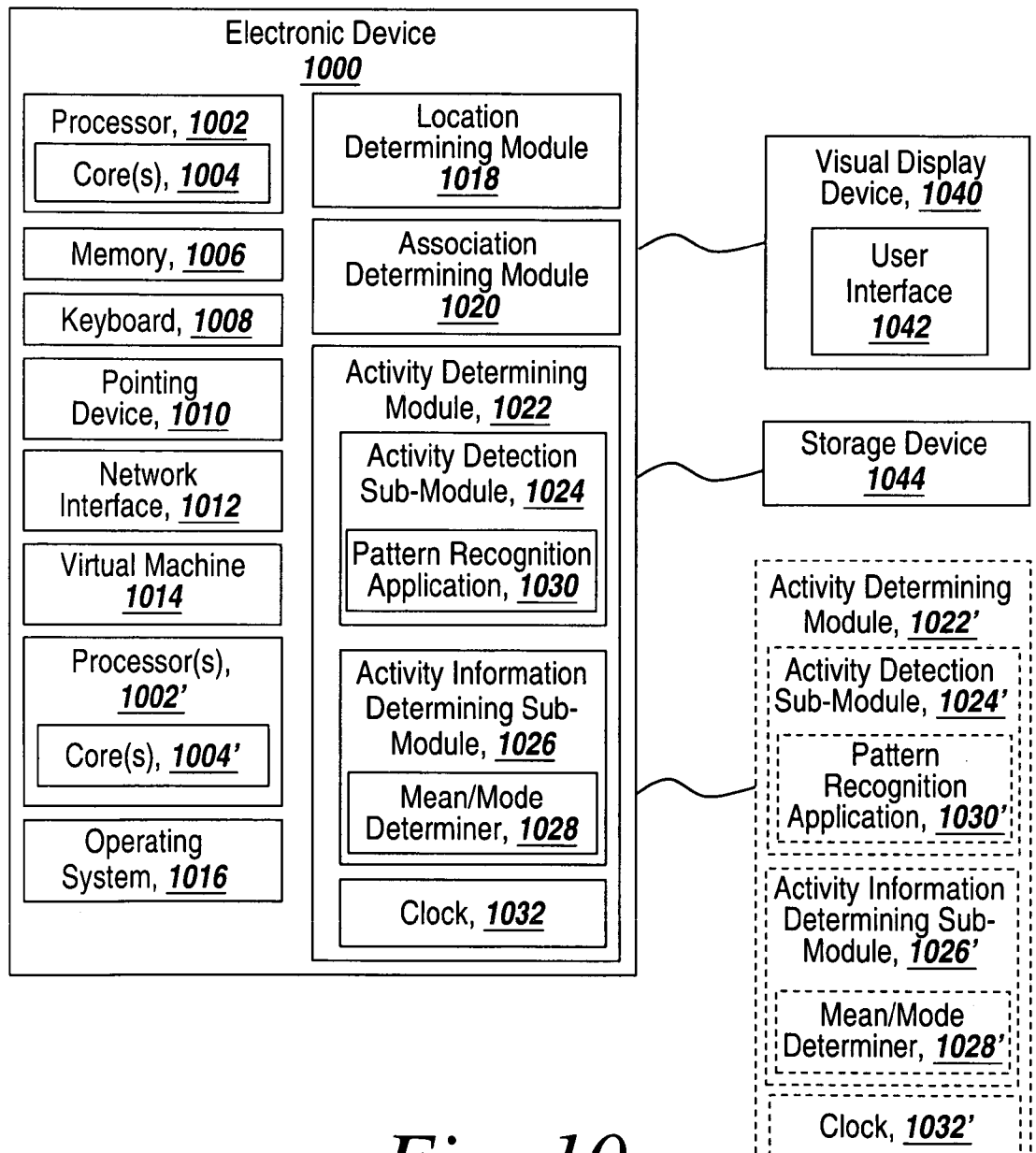
FIG. 10 illustrates an exemplary environment suitable for detecting activities and determining information associated with the detected activities, in accordance with exemplary embodiments.

FIG. 10 illustrates an exemplary environment suitable for detecting activities and determining information associated with the detected activities, in accordance with exemplary embodiments. The environment includes an electronic device 1000. In exemplary embodiments, the electronic device 1000 can be any computer system such as a workstation, desktop computer, server, laptop, handheld computer or other form of computing or telecommunications device that is capable of communication and that has sufficient processor power and memory capacity to perform the operations described herein.

The electronic device 1000 includes a location determining module 1018 that is programmed or configured to determine and track the location of one or more objects as described herein. The electronic device 1000 also includes an association determining module 1020 that is programmed or configured to determine an association between an object and one or more other objects/locales, as described herein. Locations and associations can be determined by the location determining module 1018 and the association determining module 1020, respectively, in accordance with the exemplary embodiments described above with reference to FIGS. 1-9.

The electronic device 1000 further includes an activity determining module 1022 that is programmed or configured to use context information to detect one or more activities occurring presently or that have occurred in the past, and to determine information about the detected activities. The activity determining module 1022 includes an activity detection sub-module 1024 that is programmed or configured to detect one or more activities occurring presently or that have occurred in the past. The activity detection sub-module 1024 includes a pattern recognition application 1030 that is programmed or configured to match a set of current locations/locales with a historical set of locations/locales. The activity determining module 1022 also includes an activity information determining sub-module 1026 that is programmed or configured to determine information about the detected activities. The activity information determining sub-module 1026 includes a mean/mode determiner 1028 programmed or configured to determine a primary location and/or locale of a detected activity. The activity determining module 1022 also includes a clock 1032.

In an exemplary embodiment, the activity determining module 1022 is provided integrally with the electronic device 1000. In another exemplary embodiment, the activity determining module 1022 is provided separately from the electronic device 1000 (in the form of an activity determining module 1022'), in which case the activity determining module 1022' and the electronic device 1000 are configured to communicate with each other. The activity determining module 1022' includes an activity detection sub-module 1024' and an activity information determining sub-module 1026'. The activity detection sub-module 1024' includes a pattern recognition application 1030.' The activity information determining sub-module 1026' also includes a mean/mode determiner 1028' and a clock 1032'.

The electronic device 1000 includes one or more media for storing one or more executable instructions or software for implementing exemplary embodiments. For example, a memory 1006 included in the electronic device 1000 stores executable instructions or software, e.g. instructions for implementing and processing the location determining module 1018, the association determining module 1020, and the activity determining module 1022. In an exemplary embodiment, the memory 1006 can include a computer system memory or random access memory, such as DRAM, SRAM, EDO RAM, etc. The memory 1006 can include other types of memory as well, or combinations thereof.

The electronic device 1000 includes a processor 1002 and one or more processor(s) 1002' programmed or configured to execute instructions or software stored in the memory 1006 and other programs for controlling system hardware. Processor 1002 and processor(s) 1002' each can be a single-core processor or multiple-core (1004 and 1004', respectively) processor.

Virtualization can be employed in the electronic device 1000 so that infrastructure and resources in the electronic device can be shared dynamically. Virtualized processors can also be used with the location determining module 1018, the association determining module 1020, the activity determining module 1022, and with any other applications or software in a storage device 1044. A virtual machine 1014 can be provided to handle a process running on multiple processors so that the process appears to be using only one computing resource rather than multiple. Multiple virtual machines can also be used with one processor. Other computing resources, such as field-programmable gate arrays (FPGA), application specific integrated circuit (ASIC), digital signal processor (DSP), Graphics Processing Unit (GPU), and general-purpose processor (GPP), can also be used for executing code and/or software.

A user may interact with the electronic device 1000 through a visual display device 1040, such as a monitor. The visual display device 1040 presents one or more user interfaces 1042 which allow the user to input data for the location determining module 1018, the association determining module 1020, the activity determining module 1022, or for any other applications or software. The visual display device 1040 displays results from the processing of the location determining module 1018, the association determining module 1020, the activity determining module 1022, or any other applications or software. The visual display device 1040 also displays any other aspects or elements of exemplary embodiments, e.g. data from any databases stored in the storage device 1044.

In an exemplary embodiment, the visual display device 1040 can be provided integrally with the electronic device 1000. In another exemplary embodiment, the visual display device 1040 can be provided separately from the electronic device 1000, in which case the visual display device 1040 and the electronic device 1000 are configured to communicate with each other.

The electronic device 1000 can include other input/output (I/O) devices for receiving input from a user, such a keyboard or a multi-point touch interface 1008 and a pointing device 1010, for example a mouse. The keyboard 1008 and the pointing device 1010 can be connected to the visual display device 1040. The electronic device 1000 can also include other suitable conventional I/O peripherals.

The electronic device 1000 can include the storage device 1044. A suitable storage device 1044 can include any device, component or system that can store digital or analog data, and may include, but is not limited to, memory drives such as hard drives and optical drives, Flash drives, optical media (CDS, DVDs, etc.), EPROM, EEPROM, USB drives or storage elements, RAM, ROM, database software and hardware, removable storage and secondary storage devices, or other suitable storage mediums. In an exemplary embodiment, the storage device 1044 can include one or more databases for storing formatted data associated with the objects tracked by exemplary embodiments. Examples of the stored data can include, but are not limited to, the current and historical locations/locales, roles (e.g. nurse), activities (e.g. administers medicine to patients, assists surgeons in operating rooms), current and historical associations (e.g. associated with patients, surgeons), etc, for object identifiers associated with one or more particular objects (e.g. a nurse named "Jane Doe").

In an exemplary embodiment, the storage device 1044 can be provided integrally with the electronic device 1000. In another exemplary embodiment, the storage device 1044 can be provided separately from the electronic device 1000, in which case the storage device 1044 and the electronic device 1000 are configured to communicate with each other.

The electronic device 1000 can include a network interface 1012 that is configured to interface with a network, e.g. a Local Area Network (LAN), Wide Area Network (WAN) or the Internet, through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 1012 can include a built-in network adapter, network interface card, PCMCIA network card, card bus network adapter, wireless network adapter, USB network adapter, modem or any other device suitable for interfacing the electronic device 1000 to any type of network capable of communication and performing the operations described herein.

The electronic device 1000 can be running an operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system can be running in native mode or emulated mode.

IV. Exemplary Distributed Implementations for Activity Detection

Figure 11A:
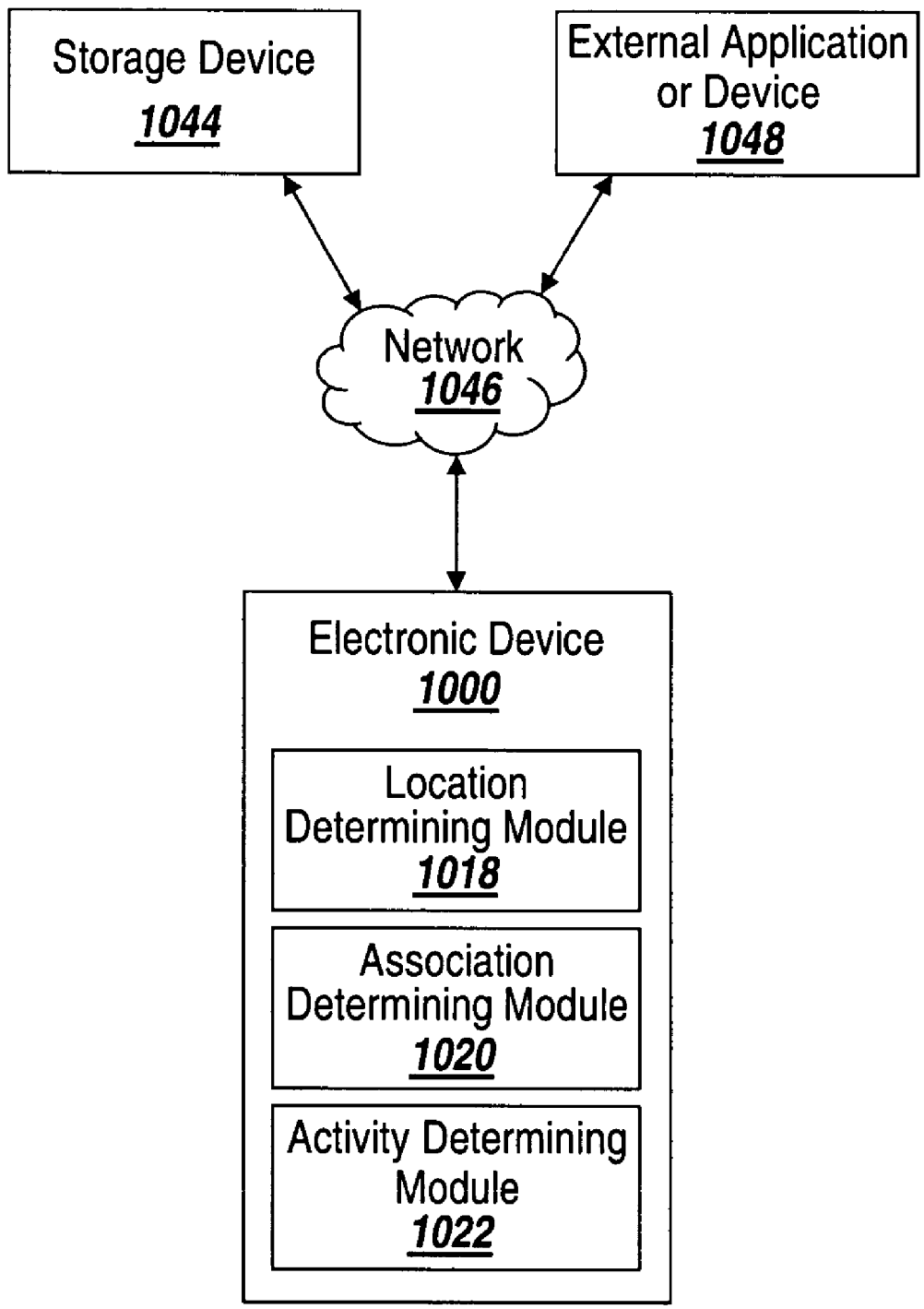
FIG. 11A illustrates an exemplary distributed implementation for the exemplary environment of FIG. 10.

FIG. 11A illustrates an exemplary distributed implementation for the exemplary environment of FIG. 10. In this exemplary distributed implementation, the activity determining module 1022 is provided integrally with the electronic device 1000.

The electronic device 1000, the storage device 1044 and an external application or device 1048 are interfaced with each other and can communicate with each other via a network 1046.

The location determining module 1018 in the electronic device 1000 determines one or more locations associated with one or more objects, as outlined above, and optionally displays and/or stores records of these locations in the storage device 1044. The location determining module 1018 optionally transmits location information to the activity determining module 1022, e.g. via an interface.

The association determining module 1020 in the electronic device 1000 uses locations associated with two or more objects/locales to determine associations between the objects/locales, as outlined above, and optionally displays and/or stores records of these associations in the storage device 1044. The association determining module 1020 optionally transmits association information to the activity determining module 1022, e.g. via an interface.

The activity determining module 1022 in the electronic device 1000 uses context information on one or more objects (e.g. object locations, associations, roles) to detect activities and determine information on the detected activities. The activity determining module 1022 optionally stores records of the detected activities and information associated with the detected activities in the storage device 1044. The activity determining module 1022 optionally displays records of the detected activities and information associated with the detected activities on the display device 1040. The activity determining module 1022 optionally transmits activity information to one or more external modules or applications, e.g. via an interface.

In an exemplary embodiment, the activity determining module 1022 obtains context information saved in the storage device 1044, the memory 1006, or an external storage, database or device. In another exemplary embodiment, the activity determining module 1022 obtains context information directly from the location determining module 1018 and/or the association determining module 1020.

In exemplary embodiments, a variety of applications, software components or modules, or devices analyze activity information about activities detected by the activity determining module 1022. The applications can be provided in the electronic device 1000 and/or can be provided externally, e.g. as an external application or device 1048. Examples of such applications include equipment utilization software, asset management software, event initiation software, billing software, etc. To access information stored in the storage device 1044, the applications use a Java Database Connectivity (JDBC) interface located in the activity determining module 1022, which allows Java™ applications to transmit Structured Query Language (SQL) commands to one or more databases on the storage device 1044. In other exemplary embodiments, the activity determining module 1022 itself uses activity information to analyze detected activities.

Those skilled in the art will recognize that the locations and types of the various components using activity information as input data may change without departing from the scope of the present invention. Those of ordinary skill will also recognize that the determining and/or storage of object locations, object associations and object activities can occur at any other location in the illustrated system.

Figure 11B:
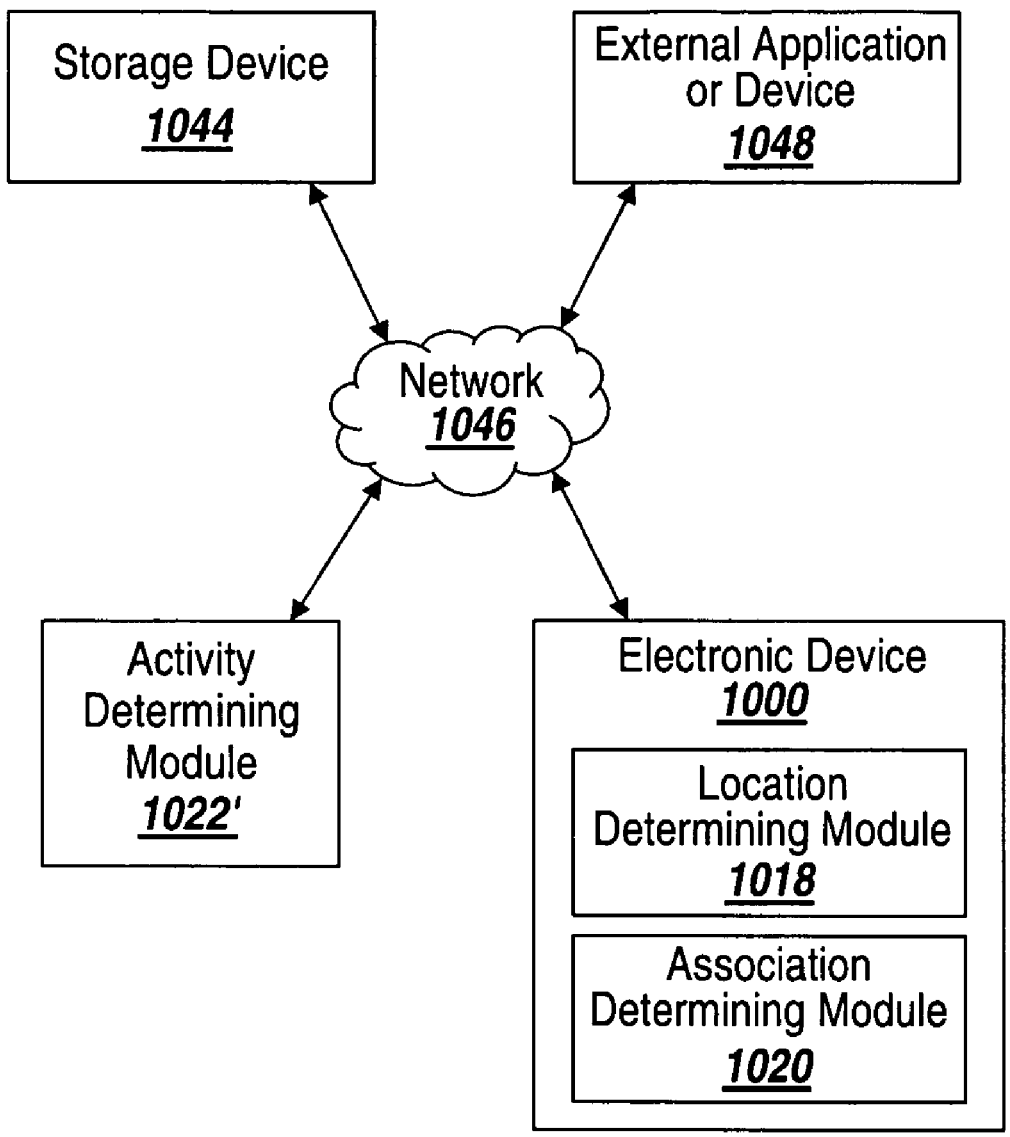
FIG. 11B illustrates another exemplary distributed implementation for the exemplary environment of FIG. 10.

FIG. 11B illustrates another exemplary distributed implementation for the exemplary environment of FIG. 10. In this exemplary distributed implementation, the activity determining module 1022' is provided separately from the electronic device 1000 and is in communication with the electronic device 1000, the storage device 1044 and the external application or device 1048 via the network 1046.

V. Activity Detection and Determination of Activity Information

Figure 12:
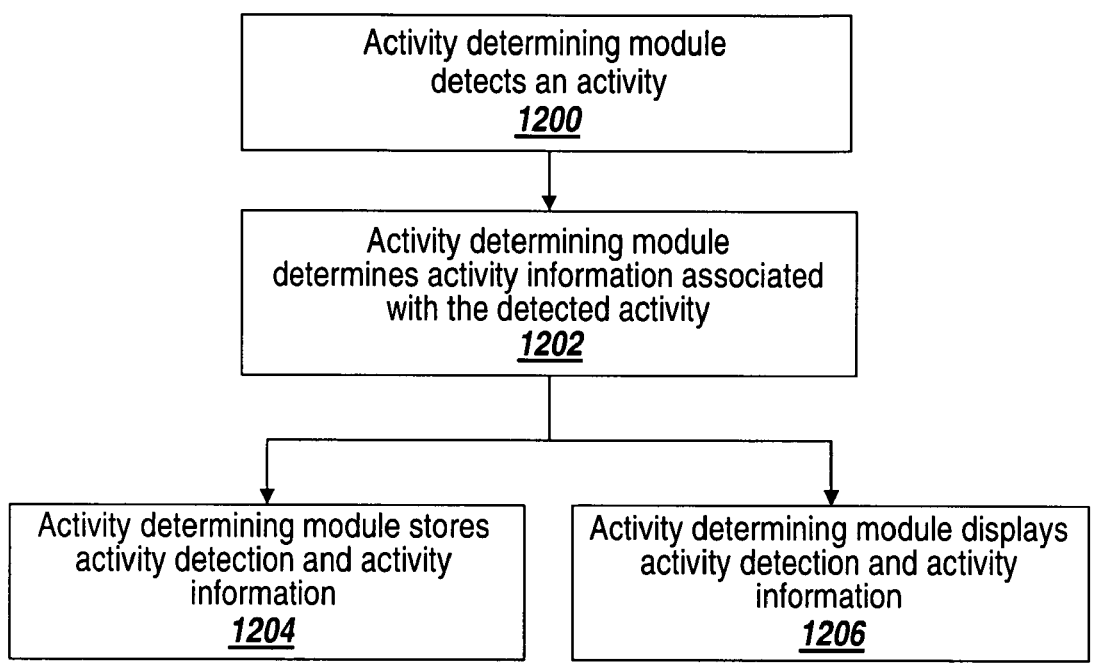
FIG. 12 illustrates an exemplary flowchart of the basic operations of an exemplary activity determining module, in accordance with exemplary embodiments.

The structure, function and operation of the activity determining module 1022 will now be described in more detail. FIG. 12 illustrates an exemplary flowchart of the basic operations of an exemplary activity determining module 1022, in accordance with exemplary embodiments.

The activity detection sub-module 1024 of the activity determining module 1022 is programmed or configured to detect one or more activities. In step 1200, the activity detection sub-module 1024 of the activity determining module 1022 detects an activity. In exemplary embodiments, the activity detection sub-module 1024 concurrently determines the type of the activity. Examples of activities/activity types include, but are not limited to, a patient being discharged from a hospital, a nurse administering a medicine to a patient, a janitor cleaning a patient's room, etc.

In some exemplary embodiments, the activity detection sub-module 1024 uses only one or more current locations or locales of an object to detect an activity involving the object. Location information can include, but is not limited to, the spatial coordinates of the object. Locale information can include, but is not limited to, any area, site, location or point of interest, e.g. a particular room, a floor, a department, a building, etc. The activity detection sub-module 1024 can obtain the current location or locale information from the location determining module 1018, a storage device, etc.

In other exemplary embodiments, the activity detection sub-module 1024 uses current location or locale information combined with one or more other items of context information about an object to detect an activity involving the object. These other items of context information can include, but are not limited to, an identity of the object, a role associated with the object, an activity associated with the object, a historical series of locations/locales, an association between the object and other objects and/or locales, etc. The activity detection sub-module 1024 can obtain these other items of information from the location determining module 1018, the association determining module 1020, a storage device, etc.

Some of the other items of information used to detect an activity, in turn, are determined based on location or locale information. As an example, a historical series of locations/locales—which can be used to detect an activity—is determined based on location/locale information. The location determining module 1018 determines one or more consecutive locations or locales of an object while the object is performing a historical activity. As used herein, the term "historical activity" is intended to include any activity performed by an object. The location determining module 1018 stores this historical series of locations or locales corresponding to the historical activity, so that the series can subsequently be used by the activity detection sub-module 1024 to detect an activity of the same type as the historical activity.

As another example, an association between two or more objects/locales—which can be used to detect an activity—is determined based on location/locale information. The association determining module 1020 determines an association between an object and one or more other objects and/or locales using location or locale information. Exemplary embodiments provide object identifiers linked with the objects/locales to provide data identifying the objects/locales. The location determining module 1018 uses the identifying data to determine the current locations/locales of the objects/locales. The association determining module 1020 uses the location/locale information to determine if the object is in proximity to the other objects/locales for a time period greater than or equal to a threshold time. If the time period that the object is in proximity to the other objects/locales is greater than or equal to the threshold time, the association determining module 1020 creates or determines an association between the object and the other objects/locales.

Some of the other items of information used to detect an activity are determined based on data identifying the object. Exemplary embodiments provide an object identifier linked with the object for providing data identifying the object. Exemplary embodiments use the data identifying the object to determine an identity of the object. The identity of the object can be, for example, an identification that is unique to the object or to a group to which the object belongs. Exemplary embodiments further use the identity of the object to determine a role associated with the object and/or an activity associated with the object, e.g. by looking up a mapping between object identities and roles/activities corresponding to each object identity.

The activity information determining sub-module 1026 of the activity determining module 1022 is programmed or configured to determine zero, one, or more items of information about a detected activity. In step 1202, the activity information determining sub-module 1026 of the activity determining module 1022 determines one or more items of information about the detected activity. Examples of activity information include, but are not limited to, the type of the activity, the identities and roles of the objects involved in the activity, the time of the activity, the duration of the activity, the primary location and/or locale of the activity, the primary location and/or locale of an object during the activity, etc.

Exemplary embodiments use the activity information determined by the activity information determining sub-module 1026 to analyze detected activities, e.g. to determine if a detected activity is in compliance with a scheduled activity. Exemplary embodiments also use the activity information to initiate events in response to a detected activities, e.g. setting off a warning if a patient is left attached to a dialysis machine for too long.

To make activity information available for any subsequent use, the activity determining module 1022 optionally stores and displays the detected activities and their associated activity information. In step 1204, the activity determining module 1022 stores the detected activity and any information about the activity in the storage device 1044 or in any other storage, device or database. In step 1206, the activity determining module 1022 displays the detected activity and any information about the activity on the visual display device 1040 for viewing by a user. In exemplary embodiments, the activity determining module 1022 can provide the detected activity and associated activity information for subsequent use by any other module, software, application or device, e.g. via an interface.

As depicted in step 1200 of FIG. 12, the activity detection sub-module 1024 of the activity determining module 1022 detects one or more activities using context information of one or more objects. Exemplary methods employed by the activity detection sub-module 1024 will now be described in more detail with reference to FIGS. 13-16.

Figure 13A:
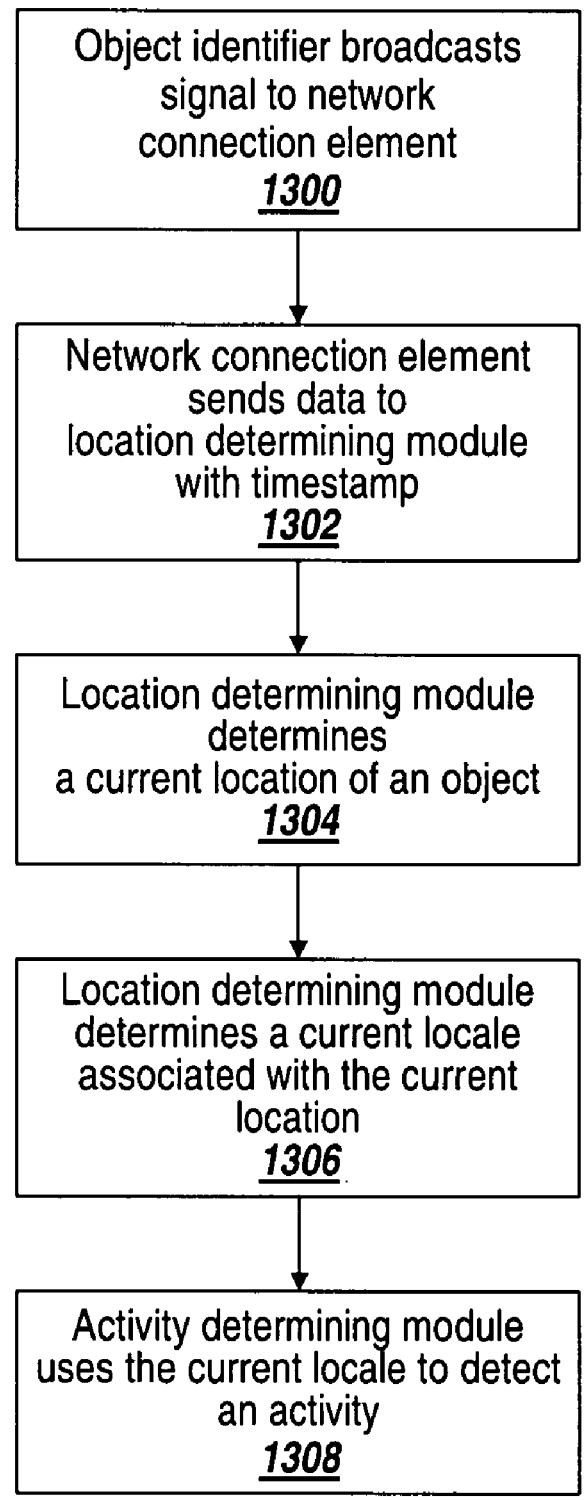
FIG. 13A illustrates an exemplary flowchart for detecting an activity involving an object using location/locale information on the object, in accordance with exemplary embodiments.

FIG. 13A illustrates an exemplary flowchart for detecting an activity involving an object using location/locale information about the object, in accordance with exemplary embodiments. In step 1300, an object identifier 102, 202, 302, 540 linked to an object broadcasts one or more signals to the network connected element 106, 206, 530. In certain exemplary embodiments, shown in FIG. 2, the object identifier 202 transmits the signal in response to a signal sent from the network connected element 206 or a fixed location identifier 120, 220, 520. The signal from the object identifier is forwarded from a fixed location identifier 120, 220, 520 to the network connected element 106, 206, 530. In step 1302, the network connected element 106, 206, 530 transforms the signal by appending information or data, such as a time stamp and its identifier, onto the signal, and transmits the signal to the electronic device 1000 and the location determining module 1018.

In step 1304, the location determining module 1018 determines the current location of the object by transforming information or data in the signal, as outlined above. In step 1306, the location determining module 1018 transforms the current location of the object (e.g. spatial coordinates) into a corresponding current locale (e.g. the room, the floor, the section of the building, etc) of the object. In an exemplary embodiment, in order to transform the current location into a corresponding current locale, the location determining module 1018 uses a mapping of locations with corresponding locales stored on the electronic device 1000, the storage device 1044 or any other storage location, e.g. in one or more databases.

In step 1308, the activity detection sub-module 1024 obtains the current locale of the object either from the location determining module 1018 or from a saved location. The activity detection sub-module 1024 uses the current locale of the object to detect an activity, by consulting a mapping of locales with corresponding activities that are performed in the locales. For example, a toilet locale can correspond to toilet-related activities. These mappings can be stored on the electronic device 1000, the storage device 1044 or any other storage location, e.g. in one or more databases.

In exemplary embodiments, the activity detection sub-module 1024 determines that an object is engaged in an activity only if the object remains in the current locale for a minimum period of time. In this case, the activity detection sub-module 1024 could be provided with a mapping of activities with their corresponding minimum durations. For example, the activity detection sub-module 1024 may detect a toilet—related activity only if a person remains in a toilet for a minimum duration of five minutes.

Figure 13B:
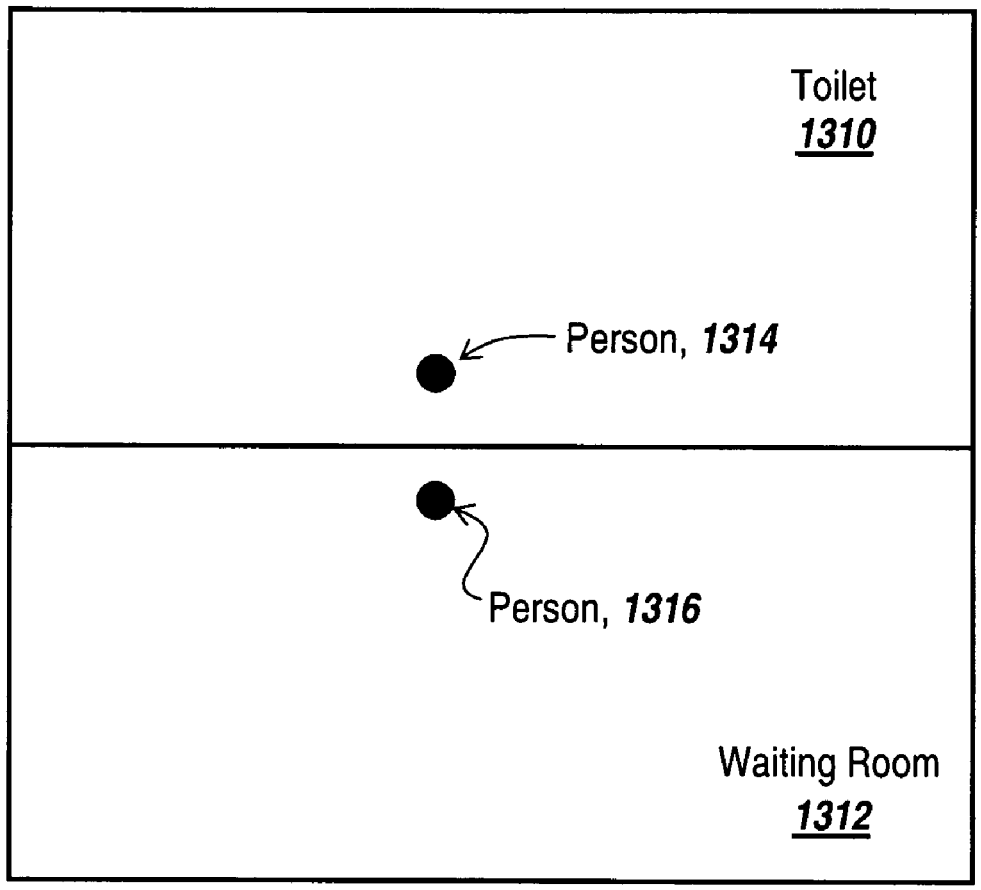
FIG. 13B illustrates an exemplary layout of two adjacent hospital rooms in which an activity is detected using location/locale information.

FIG. 13B illustrates an exemplary layout of two adjacent hospital rooms in which an activity is detected using location/locale information. The layout depicts a toilet 1310 and an adjacent waiting room 1312 which shares a common wall with the toilet 1310. A person 1314 is located in the toilet 1310, and another person 1316 is located in the waiting room 1312 near the common wall. Although persons 1314 and 1316 are in close proximity in location, the location determining module 1018 determines that they are in different locales: person 1314 is in the toilet while person 1316 is in the operating room. Using the locale information, the activity detection sub-module 1024 detects that person 1314 is engaged in a toilet-related activity like urination, defecation, vomiting, etc. However, the activity detection sub-module 1024 detects no such activity for person 1316.

Figure 14A:
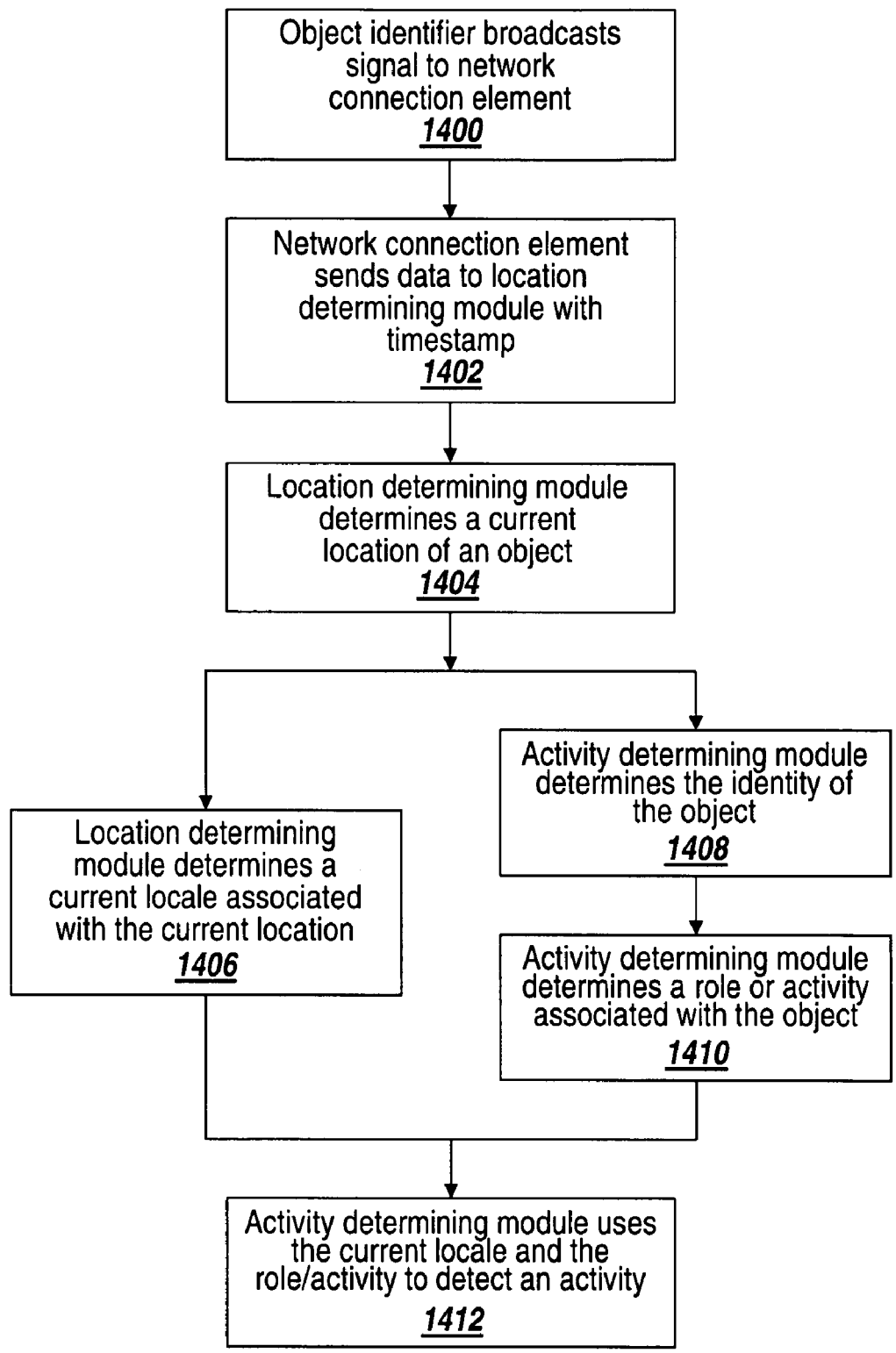
FIG. 14A illustrates an exemplary flowchart for detecting an activity involving an object using a current location/locale of the object and a role/activity associated with the object, in accordance with exemplary embodiments.

FIG. 14A illustrates an exemplary flowchart for detecting an activity involving an object using a current location/locale of the object and a role/activity associated with the object, in accordance with exemplary embodiments. In step 1400, an object identifier 102, 202, 302, 540 linked to an object broadcasts one or more signals to the network connected element 106, 206, 530. In certain exemplary embodiments, shown in FIG. 2, the object identifier 202 transmits the signal in response to a signal sent from the network connected element 206 or a fixed location identifier 120, 220, 520. The signal from the object identifier is forwarded from a fixed location identifier 120, 220, 520 to the network connected element 106, 206, 530. In step 1402, the network connected element 106, 206, 530 transforms the signal by appending information or data, such as a time stamp and its identifier, onto the signal, and transmits the signal to the electronic device 1000 and the location determining module 1018.

In step 1404, the location determining module 1018 determines the current location of the object by transforming information or data in the signal, as outlined above. In step 1406, the location determining module 1018 transforms the current location (e.g. spatial coordinates) into the current locale (e.g. the room, the floor, the section of the building, etc) of the object.

In step 1408, the activity detection sub-module 1024 obtains the object identifier of the object from the location determining module 1018 or from a saved location. In step 1410, the activity detection sub-module 1024 looks up one or more roles/activities associated with the object identifier. For example, an x-ray machine can be associated with an x-ray scanning activity, a janitor can be associated with custodial duties, etc. This mapping between the object identifier of an object and roles/activities of the object can be stored on the electronic device 1000, the storage device 1044 or any other storage location, e.g. in one or more databases. In step 1412, the activity detection sub-module 1024 also obtains the current locale of the object from the location determining module 1018 or from a saved location.

In step 1412, the activity detection sub-module 1024 uses the current locale of the object and one or more roles/activities associated with the object to detect an activity. In an exemplary embodiment, the activity detection sub-module 1024 looks up the combination of the current locale and the role/activity associated with the object in a mapping of each such combination with a corresponding activity. For example, if an object with the role of "janitor" is in an "operating room," the activity determining module 1024 detects a cleaning activity being performed by the janitor in the operating room. These mappings can be stored on the electronic device 1000, the storage device 1044 or any other storage location, e.g. in one or more databases.

Figure 14B:
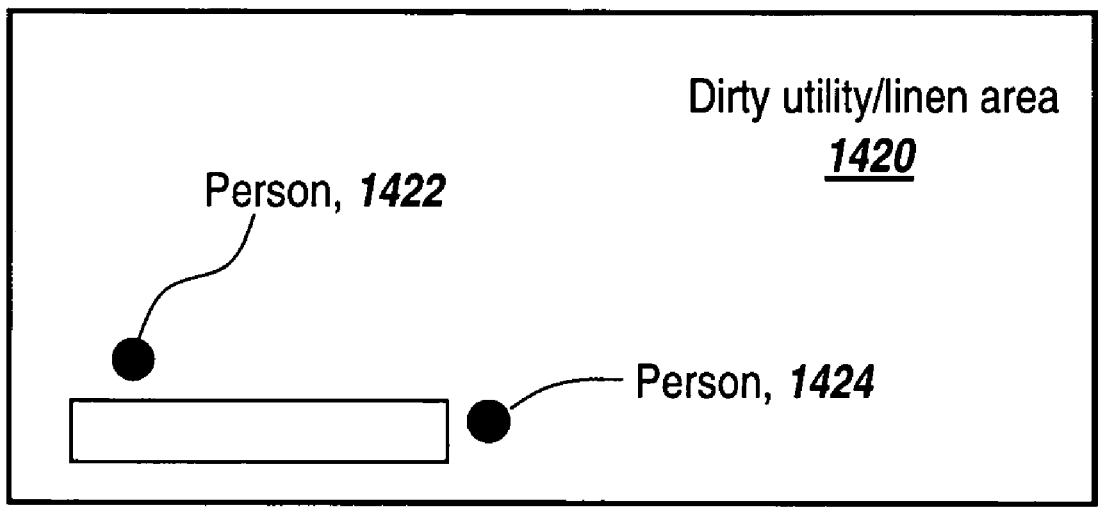
FIG. 14B illustrates an exemplary layout of a hospital room in which an activity is detected using a current location/locale of an object and a role/activity associated with the object.

FIG. 14B illustrates an exemplary layout of a hospital room in which an activity is detected using a current location/locale of an object and a role/activity associated with the object. The layout depicts a dirty utility/linen area 1420 which is the current locale for a person 1422 who has the role of a "janitor," and a person 1424 who has the role of a "surgeon." The activity detection sub-module 1024 detects that the person 1422 is performing a custodial activity based on the person's current locale of the dirty utility/linen area 1420 and the person's role as a janitor. However, the activity detection sub-module 1024 does not detect any such activity associated with the person 1424 based on the person's role as a surgeon.

Similarly, the activity detection sub-module 1024 can use the locales of two or more objects in combination with roles/activities associated with the objects to detect an activity involving the objects. For example, a patient's dialysis treatment can be detected by tracking the locations/locales of a patient, a dialysis technician and a dialysis machine. Locale information for the patient and the dialysis machine can indicate that the patient and the dialysis machine were in a particular room for 4 hours (a typical duration for dialysis treatment). Locale information for the dialysis technician can indicate that the technician was in the room for the first 10 minutes (a typical duration required to set up and start a dialysis machine), the last 10 minutes (a typical duration required to stop and unhook a dialysis machine), and periodically therebetween. Given the aforementioned locale information and the roles of the objects involved, the activity detection sub-module 1024 can detect that a dialysis treatment activity was performed on the patient.

Figure 15A:
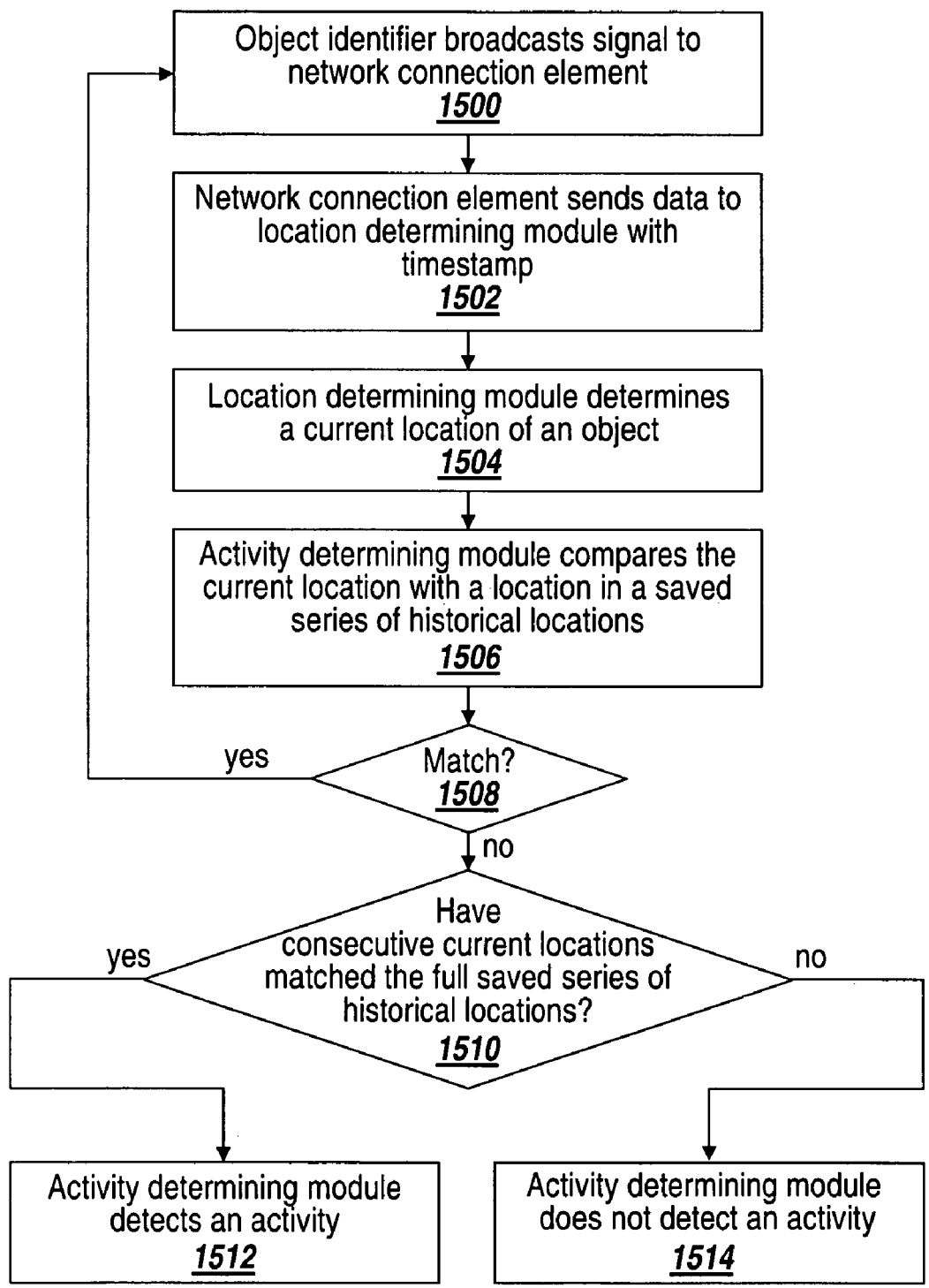
FIG. 15A illustrates an exemplary flowchart for detecting an activity involving an object by matching current locations/locales of the object with a series of historical locations/locales, in accordance with exemplary embodiments.

FIG. 15A illustrates an exemplary flowchart for detecting an activity involving an object by matching current locations/locales of the object with a series of historical locations/locales, in accordance with exemplary embodiments. A series of historical locations/locales of an object refers to any number of consecutive locations/locales of the object as recorded in the past, and corresponds to a particular historical activity. The historical activity is first detected, and information on the historical activity (e.g. locations/locales associated with the historical activity) is determined and stored for later comparison and matching.

A series of historical locations/locales can be peculiar to a particular historical activity performed by the object, and can be used to identify the same activity in the future. For example, the following series of historical locales of janitor is peculiar to a janitor cleaning a patient's room: the janitor enters a patient's room, moves to the dirty utility/linen area, then moves to the clean utility/linen area, and finally returns to the patient's room. The series of historical locations/locales can be stored on the electronic device 1000, the storage device 1044 or any other storage location, e.g. in one or more databases.

In an exemplary embodiment, the activity detection sub-module 1024 uses only the current locations/locales of an object to detect an activity. In another exemplary embodiment, the activity detection sub-module 1024 uses the current locations/locales and the role of an object to detect an activity.

In step 1500, an object identifier 102, 202, 302, 540 linked to an object broadcasts one or more signals to the network connected element 106, 206, 530. In certain exemplary embodiments, shown in FIG. 2, the object identifier 202 transmits the signal in response to a signal sent from the network connected element 206 or a fixed location identifier 120, 220, 520. The signal from the object identifier is forwarded from a fixed location identifier 120, 220, 520 to the network connected element 106, 206, 530. In step 1502, the network connected element 106, 206, 530 transforms the signal by appending information or data, such as a time stamp and its identifier, onto the signal, and transmits it to the electronic device 1000 and the location determining module 1018.

In step 1504, the location determining module 1018 determines the current location of the object by transforming information or data in the signal as outlined above. In step 1504, the location determining module 1018 optionally transforms the current location (e.g. spatial coordinates) into the current locale (e.g. the room, the floor, the section of the building, etc) of the object.

In step 1506, the activity detection sub-module 1024 compares the current location/locale with a location/locale in the series of historical locations/locales. In step 1508, the activity detection sub-module 1024 attempts to match the current location/locale of the object with the first location/locale in the series of historical locations/locales. If a match is found, this indicates that there is a possibility that the object is currently engaging in the historical activity. Thus, the method returns to step 1500 to continue matching the object's subsequent locations/locales with the historical series. That is, the activity detection sub-module 1024 then attempts to match the next consecutive current location/locale with the next consecutive location/locale in the historical series.

However, if a match fails at step 1508, the activity detection sub-module 1024 determines in step 1510 whether the matching process has reached the end of the series of historical locations/locales, i.e. whether most or all locations/locales in the historical series have already been matched with current locations/locales. If the matching process has reached the end of the historical series, the activity detection sub-module 1024 detects in step 1512 that the object was engaging in the historical activity associated with the historical series of locations/locales. However, if the matching process has not reached the end of the historical series, the activity detection sub-module 1024 does not detect any activity in step 1514.

In an exemplary embodiment, the activity detection sub-module 1024 performs the above matching as real-time current location/locale data is being determined. In another exemplary embodiment, the activity detection sub-module 1024 performs the above matching after a collection of current location/locale data is determined.

In an exemplary embodiment, the activity detection sub-module 1024 uses the pattern recognition application 1030 to compare or match the current locations/locales of the object with the historical series of locations/locales to within a minimum desired confidence. The pattern recognition application 1030 can implement one or more conventional pattern recognition algorithms including, but not limited to, the Boyer-Moore algorithm, the Knuth-Morris-Pratt algorithm, one or more naïve algorithms, the Conformational Likeness algorithm, and the like. The algorithms can operate on characters which can be applied to location/locale names stored in memory. Practitioners of the art will recognize that many different techniques can be used to accomplish the described pattern recognition or pattern matching.

The historical activity corresponding to the historical series of locations/locales can have a corresponding primary location/locale. Upon detecting a current activity by matching a current series of locations/locales with the historical series, exemplary embodiments can determine a primary location/locale of the current activity based on the primary location/locale of the historical activity.

In exemplary embodiments, the activity detection sub-module 1024 detects an activity by matching current locations/locales of the object with a series of historical locations/locales and also based on the identity or the role of the object. For example, the activity detection sub-module 1024 detects an activity based on the method described with reference to FIG. 15A only if the tracked object has a certain role or a certain identity.

In other exemplary embodiments, the activity detection sub-module 1024 detects an activity by matching current locations/locales of the object with a series of historical locations/locales and also based on an association between the object and other objects/locales. For example, the activity detection sub-module 1024 detects an activity based on the method described with reference to FIG. 15A only if the tracked object is in an association with certain other objects/locales.

Figure 15B:
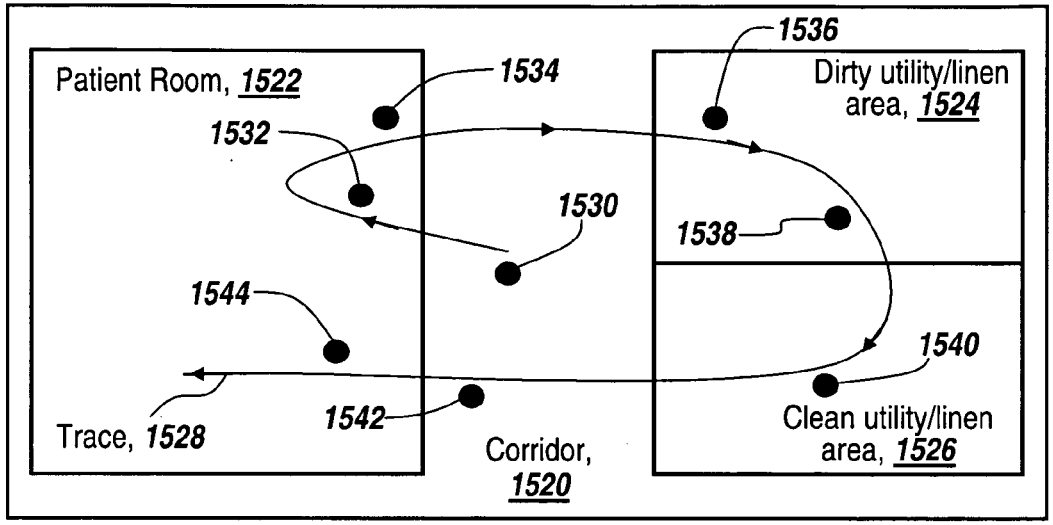
FIG. 15B illustrates an exemplary layout of a section of a hospital floor in which an activity is detected using current locations and a historical series of locations of an object.

FIG. 15B illustrates an exemplary layout of a section of a hospital floor in which an activity is detected using current locations and a historical series of locations of an object. The layout depicts a patient's room 1522 on one side of a corridor 1520, and adjacent dirty utility/linen 1524 and clean utility/linen 1526 areas on the other side of the corridor 1520. A historical activity is a janitor cleaning a patient's room. A historical series of locations corresponding to this historical activity is available. Exemplary embodiments determine a path 1528 connecting the historical series of locations, e.g. by a trace.

The location determining module 1018 of exemplary embodiments determines a janitor's current consecutive locations, depicted by points 1530-1544. The activity detection sub-module 1024 determines whether the janitor's current consecutive locations 1530-1544 fall substantially along the path 1528, not exceeding a maximum distance from the path 1528 at all times. If a full match is determined (i.e. if the janitor visits the patient's room, the dirty utility/linen area, the clean utility/linen area and the patient's room in sequence), then the activity detection sub-module 1024 detects that a patient room cleaning activity was performed by the janitor.

Figure 15C:
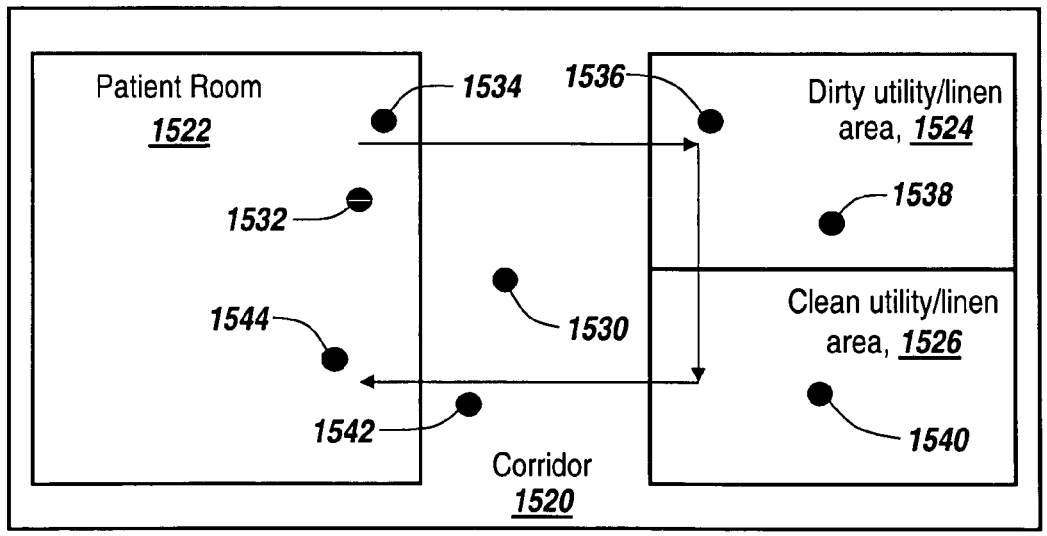
FIG. 15C illustrates the exemplary layout of FIG. 15B in which an activity is detected using current locales and a historical series of locales of an object.

FIG. 15C illustrates the exemplary layout of FIG. 15B in which an activity is detected using current locales and a historical series of locales of an object. The layout depicts a patient's room 1522 on one side of a corridor 1520, and adjacent dirty utility/linen 1524 and clean utility/linen 1526 areas on the other side of the corridor 1520. A historical activity is a janitor cleaning a patient's room. A saved historical series of locales for a janitor cleaning a patient's room includes in sequence: 1522 (a patient's room), 1524 (dirty utility/linen area), 1526 (clean utility/linen area) and 1522 (the same patient's room). The activity detection sub-module 1024 matches the janitor's current consecutive locales to consecutive locales in the historical series. If a full match is determined (i.e. if the janitor visits the patient's room, the dirty utility/linen area, the clean utility/linen area and the patient's room in sequence), then the activity detection sub-module 1024 detects that a patient room cleaning activity was performed by the janitor.

Figure 16:
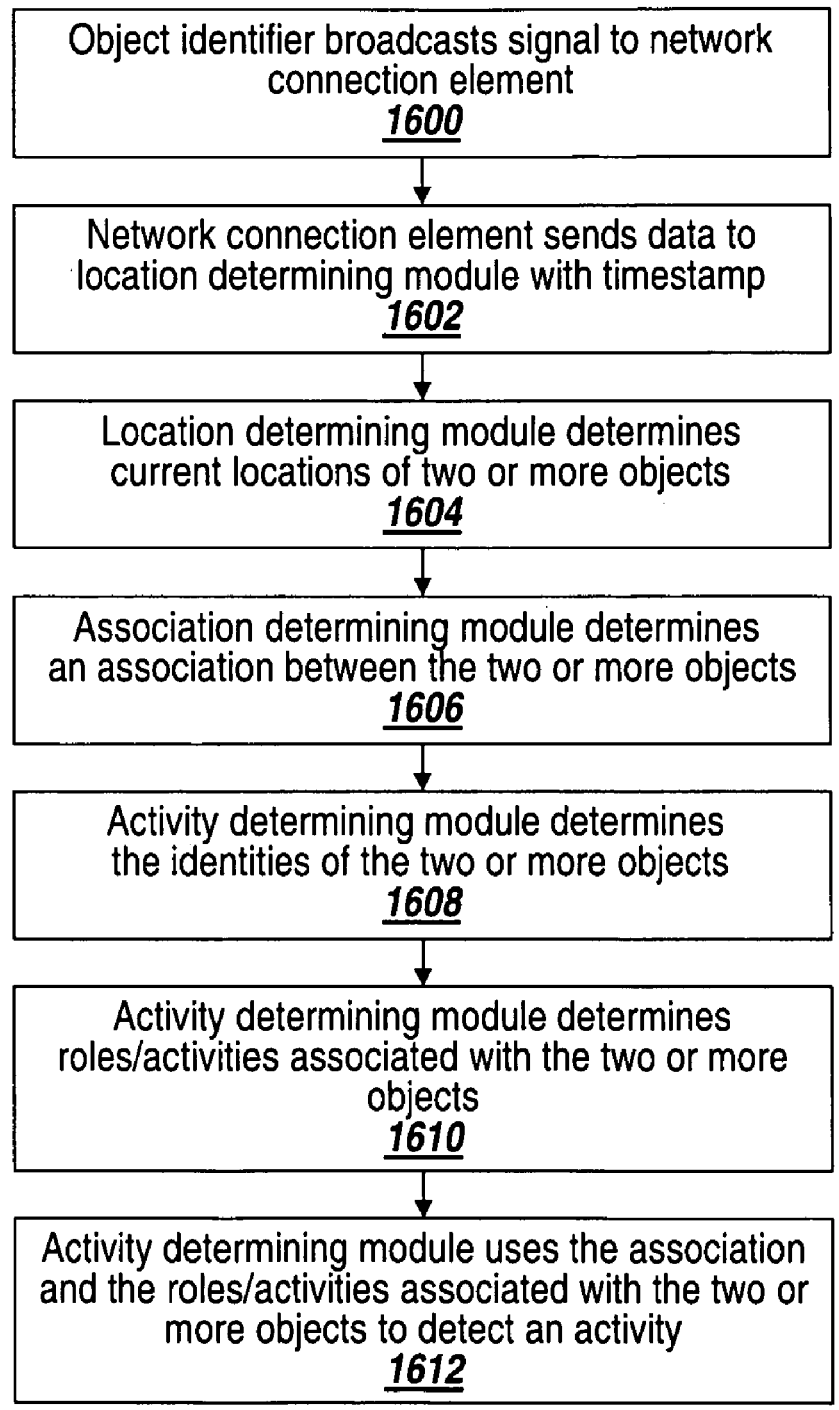
FIG. 16 illustrates an exemplary flowchart for detecting an activity using an association between two or more objects and the roles/activities associated with the objects, in accordance with exemplary embodiments.

FIG. 16 illustrates an exemplary flowchart for detecting an activity based on an association between two or more objects and also based on roles/activities associated with the objects, in accordance with exemplary embodiments. In step 1600, an object identifier 102, 202, 302, 540 linked to an object broadcasts one or more signals to the network connected element 106, 206, 530. In certain exemplary embodiments, shown in FIG. 2, the object identifier 202 transmits the signal in response to a signal sent from the network connected element 206 or a fixed location identifier 120, 220, 520. The signal from the object identifier is forwarded from a fixed location identifier 120, 220, 520 to the network connected element 106, 206, 530. In step 1602, the network connected element 106, 206, 530 transforms the signal by appending information or data, such as a time stamp and its identifier, onto the signal, and transmits it to the electronic device 1000 and the location determining module 1018.

In step 1604, the location determining module 1018 determines the current location of the object by transforming information or data in the signal as outlined above. In step 1606, the association determining module 1020 determines an association between the object and one or more other objects. In step 1608, the activity detection sub-module 1024 determines the identities of the objects involved in the association as outlined above. In step 1610, the activity detection sub-module 1024 determines one or more roles/activities associated with the objects based on their identities as outlined above.

In step 1612, the activity detection sub-module 1024 uses the association and the roles/activities associated with the object to detect an activity. In an exemplary embodiment, the activity detection sub-module 1024 looks up the combination of the association and the identities/roles/activities associated with the objects in a mapping of each such combination with a corresponding activity. This mapping of a combination of an association and object identities/roles/activities with a corresponding activity can be stored on the electronic device 1000, the storage device 1044 or any other storage location, e.g. in one or more databases.

In an exemplary embodiment, the activity detection sub-module 1024 also uses the duration of the association in detecting whether an activity occurred. That is, the activity detection sub-module 1024 does not detect an activity if the association does not last for a minimum required duration. For example, an association between a patient, a nurse and medicine container that is used to detect a medicine administration event may be required to last at least five seconds. A mapping between each type of association and a corresponding minimum required duration may be provided for the activity detection sub-module 1024.

As an example of the method depicted in FIG. 16, if an object with the role of "x-ray technician" is in an association with an object with the role of "x-ray machine" and an object with the role of "patient," the activity detection sub-module 1024 detects an x-ray scanning activity performed by the x-ray technician on the patient.

As another example, if an object with the role of "nurse" is in an association with an object with the role of "penicillin container" and an object with the role of "patient," the activity detection sub-module 1024 detects a penicillin administration activity performed by the nurse upon the patient.

In exemplary embodiments, the activity detection sub-module 1024 detects an activity based on an association between two or more objects and also based on the location/locale histories of the objects. For example, if the association determining module 1020 detects an association between two or more objects, the activity detection sub-module 1024 matches the current locations/locales of the objects with historical locations/locales. The activity detection sub-module 1024 detects an activity only if it both detects an association and also a match between the current locations/locales and the historical locations/locales.

It should be understood that the methods of detecting activities, described above with reference to FIGS. 13-16, are exemplary methods employed by the activity detection sub-module 1024. The activity detection sub-module 1024 is programmed or configured to detect activities using any item of context information or any combination of two or more items of context information associated with one or more objects.

As depicted in step 1202 of FIG. 12, the activity information determining sub-module 1026 of the activity determining module 1022 determines one or more items of information about an activity. Examples of activity information include, but are not limited to, the type of the activity, the identities and roles of the objects involved in the activity, the time of the activity, the duration of the activity, the primary location and/or locale of the activity, the primary location and/or locale of an object during the activity, etc. Exemplary methods employed by the activity information determining sub-module 1026 will now be described in more detail.

The activity information determining sub-module 1026 determines the identities and/or roles of the objects involved in a detected activity. Examples of object identities include, but are not limited to, patient with patient identifier "123," Dr. John Doe, x-ray machine with identifier "345," etc. Examples of object roles include, but are not limited to, patient, nurse, surgeon, x-ray technician, x-ray machine, container of penicillin, etc.

Exemplary embodiments provide an object identifier linked with the object for providing data identifying the object. Exemplary embodiments use the data identifying the object to determine an identity of the object. The identity of the object can be, for example, an identifier that is unique to the object or to a group of objects. Exemplary embodiments further use the identity of the object to determine a role associated with the object, e.g. by looking up a mapping of object identities with roles corresponding to each object identity.

In some exemplary embodiments, the object identifier transmits data that directly indicates one or more roles of the object. Thus, it is not necessary in these embodiments to transmit data identifying the object and then looking up the object's roles based on the identifying data. The object identifier directly transmitting role information allows the object to remain anonymous, while still determining the roles and activities of the object. For example, it might be acceptable to know that the role of an object is that of a "housekeeper," without having to first identify the housekeeper by name. In this case, the activity determining module 1022 may detect that a room cleaning activity was performed by an object with the role "housekeeper," without knowing the specific identity of the housekeeper.

In an exemplary embodiment, upon detecting an activity in step 1200 or upon request by the activity information determining sub-module 1026, the activity detection sub-module 1024 determines the identities and/or roles of the objects and transmits them to the activity information determining sub-module 1026. In an exemplary embodiment, the activity detection sub-module 1024 already possesses the object identifiers. In other exemplary embodiments, the activity detection sub-module 1024 queries the location determining module 1018 or any storage location to obtain the object identifiers of the objects. The activity detection sub-module 1024 uses the object identifiers to look up the identities and/or roles associated with the objects. For example, the activity detection sub-module 1024 can look up the identities and/or roles of an object in a mapping of the object identifier of an object and the corresponding identities and/or roles associated with the object stored on the electronic device 1000, the storage device 1044 or any other storage location, e.g. in one or more databases.

In another exemplary embodiment, upon the detection of an activity in step 1200, the activity information determining sub-module 1026 itself determines the identities and/or roles of the objects. In an exemplary embodiment, the activity information determining sub-module 1026 obtains the object identifiers and corresponding identifies and/or roles directly from a storage location. In another exemplary embodiment, the activity information determining sub-module 1026 obtains the object identifiers from the activity detection sub-module 1024 or from the location determining module 1018 as outlined above. The activity information determining sub-module 1026 uses the object identifiers to look up the identities and/or roles associated with the objects. For example, the activity information determining sub-module 1026 can look up the identities and/or roles of an object in a mapping of the object identifier of an object and the corresponding identities and/or roles associated with the object stored on the electronic device 1000, the storage device 1044 or any other storage location, e.g. in one or more databases.

The activity information determining sub-module 1026 determines the time of a detected activity using the clock 1032. Upon detecting an activity in step 1200, the activity detection sub-module 1024 communicates the beginning of the activity to the activity information determining sub-module 1026. Upon receiving this communication, the activity information determining sub-module 1026 checks the current time of the clock 1032 to determine the start time of the detected activity.

The activity information determining sub-module 1026 determines the duration of a detected activity using the clock 1032. Upon detecting an activity in step 1200, the activity detection sub-module 1024 transmits a first communication of the beginning of the activity to the activity information determining sub-module 1026. The activity information determining sub-module 1026 uses this first communication to determine the start time of the detected activity. The activity detection sub-module 1024 continues its detection of the same activity, until it can no longer detect the activity. At this stage, the activity detection sub-module 1024 transmits a second communication of the end of the activity to the activity information determining sub-module 1026. Upon receiving the second communication, the activity information determining sub-module 1026 checks the current time of the clock 1032 to determine the end time of the detected activity. The activity information determining sub-module 1026 then uses the start and end times to determine the duration of the activity.

The activity information determining sub-module 1026 determines the primary location/locale of a detected activity by analyzing the locations/locales of the one or more objects involved in the detected activity. Exemplary embodiments provide an object identifier linked with the objects involved in the activity for providing data identifying the objects. The activity information determining sub-module 1026 first obtains information on the object identifiers of the objects involved in the activity as outlined above.

Starting at the start time of the detected activity, the activity information determining sub-module 1026 transmits a first request to the location determining module 1018 to use data provided by the object identifiers to track the locations of the objects involved in the detected activity. In an exemplary embodiment, the location determining module 1018 transmits the object locations to the activity information determining sub-module 1026 in real-time as it is tracking the objects. In this embodiment, at the end of the detected activity, the activity information determining sub-module 1026 transmits a second request to the location determining module 1018 to stop transmitting the object locations. In response, the location determining module 1018 stops the real-time transmission of object locations. In another exemplary embodiment, the location determining module 1018 transmits all the object locations tracked during the activity only upon receiving a second request from the activity information determining sub-module 1026 at the end of the detected activity.

The activity information determining sub-module 1026 also determines one or more locales (e.g. the room, the floor, the section of the building, etc) corresponding to the one or more locations of the objects (e.g. spatial coordinates) tracked during the activity. For example, the activity information determining sub-module 1026 can look up the locale in a mapping of locations with corresponding locales stored on the electronic device 1000, the storage device 1044 or any other storage location, e.g. in one or more databases.

The activity information determining sub-module 1026 then uses the object location/locale information tracked during the activity to determine the primary location/locale of the activity. In an exemplary embodiment, the activity information determining sub-module 1026 uses a mean/mode determiner 1028 to determine the mean or the mode of the object locations/locales, which is taken to be primary location/locale of the activity.

Similarly, the activity information determining sub-module 1026 determines the primary location/locale of an object during a detected activity. The activity information determining sub-module 1026 employs the method described above using the tracked locations of only one object involved in the detected activity.

In exemplary embodiments, after determining information about a detected activity, the activity information determining sub-module 1026 stores the activity detection and activity information in the memory 1006, the storage device 1044, etc. In another exemplary embodiment, the activity information determining sub-module 1026 transmits the activity detection and activity information to an external application, software or device, e.g. via an interface. In exemplary embodiments, after determining information about a detected activity, the activity information determining sub-module 1026 also displays the activity detection and activity information on the display device 1040.

It should be understood that the methods of determining activity information described above are exemplary methods employed by the activity information determining sub-module 1026. The activity determining sub-module 1026 is programmed or configured to determine any item of information associated with a detected activity.

VI. Exemplary Uses of Activity Information

In exemplary embodiments, internal applications provided in the electronic device 1000 and/or external applications or devices 1048 can make use of activity information determined by the activity determining module 1022. In other exemplary embodiments, the activity determining module 1022 itself can make use of activity information. Exemplary uses of activity information determined by the activity determining module 1022 will now be described in more detail.

Activity information can be used by billing software to determine the amount to bill for an activity. For example, the billing software can use activity information to determine the duration of an operation performed by a surgeon, in order to determine the amount to bill the patient.

Activity information can be used to determine compliance of an activity with established protocols, regulations or policies. In hospitals, objects being tracked may include patients, hospital personnel (e.g. doctors, nurses, technicians, janitorial staff, etc), equipment (e.g. monitors, x-ray machines, pumps, infusers), and medical supplies (e.g. medicines, blood). The objects being tracked may have roles and activities associated with them. For example, patients are admitted, assigned to rooms, treated by hospital personnel, and discharged; doctors and nurses attend to patients and perform surgeries; technicians operate equipment; equipment is used on patients; and supplies are securely stored and administered. In many instances, the hospital is responsible for ensuring that activities involving the tracked objects are performed in compliance with health, safety and insurance regulations, as well as defined care plans and hospital policies. It would thus be very advantageous to detect activities and determine if the activities are in compliance with established protocols, regulations or policies.

Figure 17:
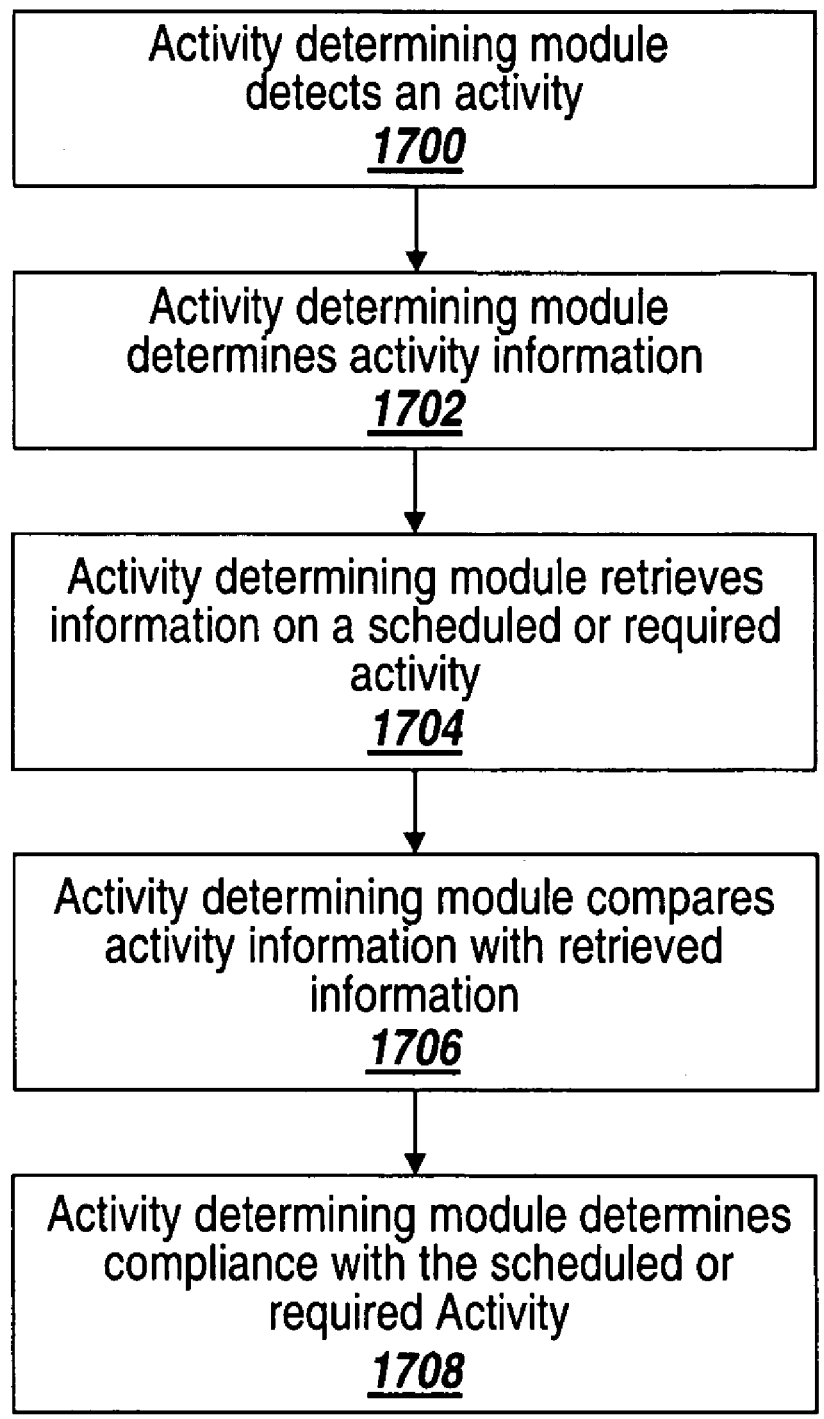
FIG. 17 illustrates an exemplary flowchart for determining compliance of a detected activity with established protocols, regulations or policies, in accordance with exemplary embodiments.

FIG. 17 illustrates an exemplary flowchart for determining compliance of a detected activity with established protocols, regulations or policies using information associated with the detected activity, in accordance with exemplary embodiments. For example, activity information associated with personnel (e.g. doctors, nurses, technicians, janitors) can be used to keep track of their tasks and to ensure that the tasks are performed in a timely fashion.

In step 1700, the activity determining module 1022 detects a current activity. In step 1702, the activity determining module 1022 determines information associated with the current activity, e.g. the type of the activity, the identity of objects participating in the activity, the time the activity took place, etc.

In step 1704, the application or software determining compliance retrieves one or more items of information on a scheduled or required activity. The information can include, but is not limited to, the type of the activity, the identity of objects participating in the activity, the time the activity took place, etc. The information can be stored in the storage device 1044, in the memory 1006 of the electronic device 1000, or in any internal or external media.

In step 1706, the application or software determining compliance compares the current activity with the retrieved information on the scheduled or required activity. In step 1708, based on the comparison in step 18, the application or software determines if the current activity is in compliance with and satisfies the requirements of the scheduled or required activity. In an exemplary embodiment, the application or software determines that the current activity is in compliance with the scheduled or required activity if information associated with the current activity matches all of the items of information retrieved on the scheduled or required activity.

As an example, determining compliance can involve verifying if one or more scheduled or required activities have occurred, e.g. that a patient has been x-rayed. As another example, determining compliance can involve determining that a step in a process is complete and that the next step in the process can commence, e.g. that a patient has been prepared for surgery and that the surgery can begin. As yet another example, determining compliance can involve verifying that the current activity has the same activity type and the same time of activity as that of a scheduled or required activity, e.g. that a medicine administration activity has been performed at 1 pm.

After determining compliance or non-compliance of the current activity with the scheduled or required activity, the application or software optionally stores this compliance information, such as in the storage device 1044, in the memory 1006 of the electronic device 1000 or in any other storage or device. The application or software optionally displays the compliance information on the visual display device 1040. In addition, the application or software optionally initiates an event in response to the determination of compliance or non-compliance. For example, in response to drug non-compliance, the application or software can set off an alert or alarm at a nurse's station.

Determining compliance can have various applications in various locations or locales. As an example, activity information can be used to determine and improve drug compliance, i.e. drug administration to a patient in correct doses at correct times. A patient with patient identifier "123" may require administration of penicillin everyday at 1 pm. The objects being tracked in this example may be the patient with patient identifier "123," a nurse assigned to the area, and possibly a container of penicillin. The activity determining module 1022 may detect an activity every time a nurse administers penicillin to the patient with patient identifier "123." The activity determining module 1022 may determine information associated with the detected activity: the type of the activity (drug administration), the identity of objects involved (patient with patient identifier "123," penicillin), the time of the activity (1 pm). To determine compliance, the activity information can be analyzed to determine if such an activity occurred every day at 1 pm.

As another example, activity information can be used to determine and improve proper medicine storage. A container of penicillin may need to be stored in a cold storage unit when not in use. The objects being tracked in this example may be a patient, a nurse, a container of penicillin and a cold storage unit. The activity determining module 1022 can detect penicillin administration activities involving the patient, the nurse and the penicillin container. The activity determining module 1022 can also detect medicine storing activities in which the nurse stores the penicillin container in the cold storage unit. Activity information associated with these two types of activities can be used to determine if the penicillin container is properly located in the cold storage unit between the penicillin administration activities.

As a further example, activity information can be used to determine whether a patient was discharged as scheduled. A patient with patient identifier "234" may be scheduled for discharge on a particular day. The objects tracked in this example may be the patient with patient identifier "234" and an orderly. If an orderly enters a patient room and the patient and orderly then leave the room together, the activity determining module 1022 may detect that a discharge activity has occurred. The activity determining module 1022 may also determine the time of the discharge activity and the identity of the objects involved (patient with patient identifier "234"). The activity information can be used to determine if the correct patient was discharged at the correct time.

Figure 18:
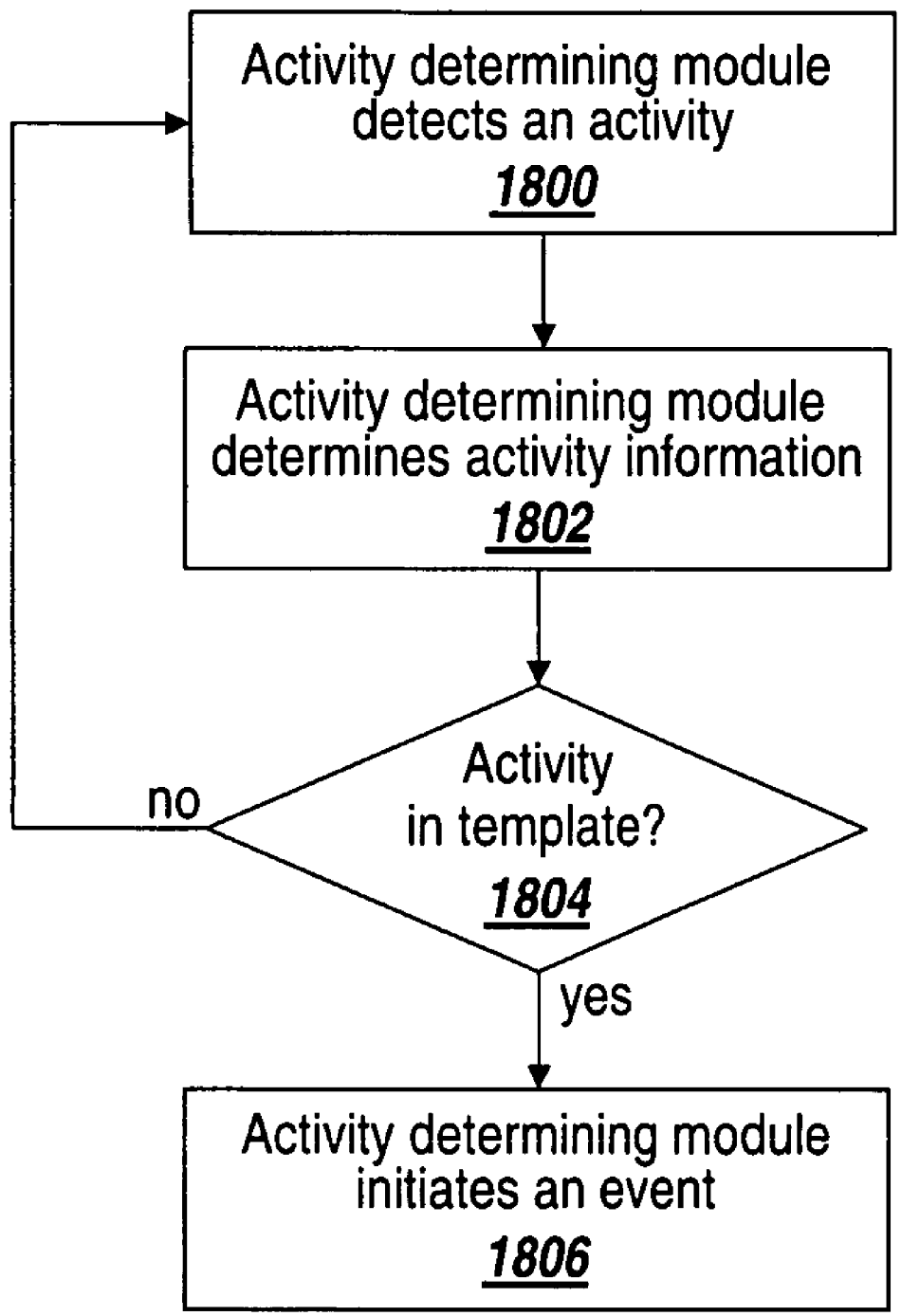
FIG. 18 illustrates an exemplary flowchart for initiating an event in response to a detected activity, in accordance with exemplary embodiments.

Activity information can also be used to initiate an event in response to an activity. FIG. 18 illustrates an exemplary flowchart for initiating an event in response to a detected activity using information associated with the detected activity, in accordance with exemplary embodiments. In step 1802, the activity determining module 1022 determines information associated with the current activity, e.g. the type of the activity, the identity of objects participating in the activity, the time the activity took place, etc. In step 1804, the application or software performing the event initiation retrieves a template of events from a database, storage or device. The template may include a list of events and the corresponding activity or activities (and necessary characteristics of the activities) that will trigger each event. In step 1804, the application or software determines if the current activity is listed in the template. If no such activity exists in the template, then the application or software waits until the activity determining module 1022 detects another activity. However, if the current activity (with its characteristics) exists in the template, then the application or software looks up the event corresponding to the current activity in the template. In step 1806, the application or software then initiates the event corresponding to the current activity.

In exemplary embodiments, event initiation involves performing an action in response to a detected activity. For example, in response to the performance of a toilet-related activity (e.g. urination/defecation) in a toilet, exemplary embodiments can automatically initiate the flushing mechanism of the toilet.

In exemplary embodiments, event initiation involves setting off an alert in response to a detected activity. In an exemplary embodiment, in response to a detected activity, an alert can be set off to indicate that a further action may be performed in response to the activity. For example, when the detected activity is the cleaning of a patient's bed, exemplary embodiments can set off a visual or auditory alert to notify a nurse manager that the previously dirty bed is now clean and ready for the next patient.

In another exemplary embodiment, an alert can be set off as a warning in response to the detection of a potentially dangerous activity, e.g. when a patient is left attached to a dialysis machine for too long. In this case, the objects tracked may be the patient and the dialysis machine. The activity determining module 1022 may detect a current dialysis activity when the patient is attached to the dialysis machine. The activity determining module 1022 can also determine the duration of the current dialysis activity. A saved template can provide instructions on setting of an alarm at a nurse's station if a dialysis activity continues beyond a maximum duration. If the duration of the current dialysis activity is too long, an application or software can consult the saved template and accordingly set off an alarm at a nurse's station.

Although many of the examples listed herein have been made with reference to a hospital environment, exemplary embodiments can be used to detect activities and determine activity information in a variety of other environments and industries. For example, in the setting of an airport, exemplary embodiments can be used to detect plane take-offs and landings, to verify that bags are being checked, etc. In the setting of a store, exemplary embodiments can be used to verify that products are being checked out properly at the register, etc. Since exemplary embodiments are designed to work with components which utilize existing network topology, activities may be determined in many different environments and the environments listed herein are intended merely as illustrative examples and not as an exhaustive list.

It will thus be seen that exemplary embodiments attain the objectives stated herein. Since certain changes may be made without departing from the scope of the present invention, it is intended that all matter contained in the above description or shown in the accompanying figures be interpreted as illustrative and not in a literal sense. Practitioners of the art will realize that the sequence of steps depicted in the figures may be altered without departing from the scope of the present invention and that the illustrations contained herein are singular examples of a multitude of possible depictions of the present invention.

What is claimed is:

1. A system for determining an activity involving at least one object at an indoor site, the system comprising:
   a real-time bi-directional object identifier device linked with each of the at least one objects for providing data identifying the at least one object,
   at least one fixed location identifier (FLI) providing data to determine a 3-D spatial location of the at least one object;
   at least one network connected element (NCE) providing data to determine the 3-D spatial location of the at least one object;
   at least one locale comprising spatial locations associated with a structural feature of the indoor site;
   a topology module comprising spatial locations mapped to the structural features of the indoor site, whereby the locales are defined by their spatial locations and stored, 3-D spatial locations of the FLIs and the NCEs are stored, and false-association threshold times for locales and object-types are stored;
   a location determining module (LDM) comprising an object location module (OLM) and an object association module (OAM), the LDM is configured to determine a location of the object from the data identifying the object, wherein the location of the object is a point in space defined by the 3-D spatial coordinates of the real-time bi-directional object identifier device;
   the object location module (OLM) is configured to calculate a 3-D spatial location origin of a signal from the at least one real-time bi-directional object identifier device comprising:
   known positions of the at least one FLI and the at least one NCE receiving the signal,
   historical recorded positions of the object,
   characteristics of the receivers receiving the signal,
   strength of the received signal,
   type of the signal, and
   whether the signal was repeated;
   the object association module (OAM) is configured to prevent false associations comprising an object type, a first locale (L1), a second locale (L2), a time spent in the first locale (tL1), and a time spent in the second locale (tL2), wherein if the tL1 is greater than or equal to a false association threshold time between L1 and L2 (tFALSE L1-L2) and the tL2 is less than the tFALSE L1-L2, association with L2 is prevented and only an association with L1 is made for the object having the specified object type, whereby a false association determination is prevented;
   an association determining module configured to determine an association between the at least one object and at least one of a locale, a role, and 3-D location based on the current 3-D location of the at least one object and its time duration there;
   an activity determining module comprising an activity detection sub-module and an activity information sub-module, the activity determining module configured to determine the activity involving the object based on the 3-D location of the object and activity information associated with predetermined activities;
   the activity detection sub-module comprising a pattern recognition application, the activity detection sub-module configured to detect an activity using a current location and a current locale based on correspondences of mapped contextual information, providing the detected activity to the activity determining module
   wherein the activity detection sub-module performs mappings of contextual information comprising
   mapping activities with minimum durations,
   mapping object identifiers with roles,
   mapping object identifiers with identities,
   mapping locales with activities,
   mapping current locales with activities,
   mapping a primary mean location with activities;
   mapping a primary mean locale with activities;
   mapping a primary mode location with activities;
   mapping a primary mode locale with activities;
   mapping roles with activities,
   mapping identities with activities,
   mapping associations with activities,
   mapping association types with minimum durations,
   mapping matched historical sets of locations with a set of current locations;
   mapping matched historical sets of locales with a set of current locales; and
   mapping combinations of current locale, role, identity, and association with activity,
   the pattern recognition application is configured to match the set of current locations with the historical set of locations and to match the set of current locales with the historical set of locales;
   the activity information determining sub-module comprising a mean/mode determiner, the activity information determining sub-module configured to determine items of information about an activity detected by the activity detection sub-module to provide to the activity determining module;
   the mean/mode determiner configured to determine the arithmetic mean and the mode of 3-D spatial locations of the object and the mean and the mode of locales of the object based on the present and historic values, wherein the arithmetic mean equals a sum of the present values and the historic values divided by the number of values, and wherein the mode equals the value most frequently occurring of the present and historic values, wherein the primary mean location is the arithmetic mean of 3-D spatial locations;

wherein the primary mean locale is a the arithmetic mean of locales;

wherein the primary mode location is the mode of 3-D spatial locations;

wherein the primary mode locale is a the mode of locales;

wherein the mean/mode determiner provides the primary mean location, the primary mean locale, the primary mode location, and the primary mode locale as items of information to the activity information sub-module;

wherein the object identifier broadcasts the signal from the at least one real-time bi-directional object identifier device to the at least one FLI and the at least one NCE;

the NCE sends data broadcast in the object identifier signal with a timestamp to the location determining module the location determining module determines a current location of the object in relation to known structural features of the site the location determining module determines a current locale associated with the current location of the object from the mappings in the topology module the association determining module determines the association between the at least one object and at least one of a locale, a role, and 3-D location based on the current 3-D location of the at least one object and its time duration there; and the activity determining module determines the activity involving the object based on the 3-D location of the object and activity information associated with predetermined activities.

2. The system of claim 1, wherein the activity determining module displays records of the detected activities and information associated with the detected activities on a display device.

3. The system of claim 1, wherein the items of information comprise an identity of the object,
a role of the object, an association between the object and a second object, or
a series of historical locations.

4. The system of claim 1, wherein the location comprises at least one locale, the locale being any one of an area, site, location, point of interest, patient room, emergency room, operating room, intensive care room, quarantine room, laboratory, and equipment room, the locale comprising the spatial location defined within the stored topology of the site in which the activity involving the object occurs.

5. The system of claim 1, wherein the real-time object identifier device comprises one or more of:
a transmitter configured to transmit a signal including the data identifying the object,
a receiver configured to receive a signal requesting the data identifying the object, and
a processor to control the transmitter and the receiver of the real-time object identifier device.

6. The system of claim 1, wherein the location determining module comprises:
a receiver to receive a signal from the real-time object identifier device providing the data identifying the object, and
a transmitter to transmit a request for data identifying the object.

7. The system of claim 1, further comprising:
a network, wherein the location determining module and the activity determining module are coupled to the network,
the network connected element including at least one signaling component capable of transmitting or receiving signals, wherein the network connected element is configured to receive the data identifying the object provided by the real-time object identifier device and transmit a signal containing the data to the location determining module.

8. The system of claim 1, further comprising:
a second real-time object identifier device linked with a locale for providing data identifying the locale, the location determining module using the data identifying the locale to determine a location of the locale.

9. The system of claim 1, wherein the association determining module is configured to:
use the location of the object and the locale of the object to determine if the object is in proximity to the locale for a time period greater than or equal to a threshold time, wherein if the time period that the object is in proximity to the locale is greater than or equal to a locale threshold time, determine the association between the object and the locale.

10. The system of claim 1, wherein at least one location is defined by a real-time object identifier device linked with the location by placement at that location in space.

11. The system of claim 1, wherein the activity determining module determines an activity from a role transmitted from the real-time object identifier device, wherein the identity is unknown, whereby the object remains anonymous.

12. The system of claim 1, wherein the historical set of locations corresponding to an historical activity are determined by recording consecutive locations of the object by the system while the object was previously performing the historical activity.

13. The system of claim 1, wherein the activity detection sub-module is configured to:
determine a time duration for which the object is located at the location, and
detect the activity of the object only if the object is located at the location for at least a predetermined time duration corresponding to stored location-activity-time durations whereby false activity determinations are prevented.

14. The system of claim 1, wherein the activity detection sub-module is configured to:
receive a series of historical locations of the object, the series of historical locations corresponding to a historical activity involving the object,
compare the series of locations of the object with the series of historical locations of the object, and
detect that the object is involved in the historical activity if the series of current locations matches the series of historical locations.

15. The system of claim 1, wherein the pattern recognition application comprises pattern recognition implemented by a Conformational Likeness algorithm operating on characters of names of locations and locales to determine the activity involving the object.

16. The system of claim 1, wherein the
activity information determining sub-module transmits a first request to the LDM to track locations of objects involved in a detected activity at the detected activity's start time and transmits a second request to the LDM to stop transmitting the object locations when the detected activity ends.

17. The system of claim 1, wherein the activity detection sub-module further comprises an activity template whereby activities are matched with events and respective events are initiated upon positive matching.

18. The system of claim 1, wherein the information associated with the activity of the object comprises a type of activity, a time of the activity, and a duration of the activity.

19. The system of claim 1, wherein the activity determining module detects the activity based on at least one primary location of the object, the role of the object, and an association between the object role and the at least one primary location, wherein the activity is any one of
- a surgical procedure activity comprising the roles of surgeon, patient, and nurse, and the primary location is an operating room;
- a nurse rounds activity comprising the roles of nurse and a plurality of patients, and the primary location is a plurality of patient rooms;
- a cleaning rounds activity comprising the role of janitor, and the primary location is a plurality of patient rooms;
- an x-ray scanning activity comprising the roles of x-ray technician, patient, and x-ray machine, and the primary location is a patient room; and
- a blood testing activity comprising the roles of phlebotomist and patient, and the primary location is a patient room.

20. A system for determining an activity involving at least one object, the system comprising:
- a real-time object identifier bi-directional transceiver device linked with each of the at least one objects to provide data identifying the at least one object,
- at least one fixed location identifier (FLI) providing data to determine a 3-D spatial location of the at least one object;
- at least one network connected element (NCE) providing data to determine the 3-D spatial location of the at least one object;
- at least one locale comprising spatial locations associated with a structural feature of the site
- a topology module comprising spatial locations mapped to the structural features of the site, whereby the locales are defined by their spatial locations and stored, 3-D spatial locations of the FLIs and the NCEs are stored, and false-association threshold times for locales and object-types are stored;
- a location determining module (LDM) comprising an object location module (OLM) and an object association module (OAM), the LDM is configured to determine a location of the object from the data identifying the object, wherein the location of the object is a point in space defined by the 3-D spatial coordinates of the real-time bi-directional object identifier device;
- the object location module (OLM) is configured to calculate a 3-D spatial location origin of a signal from the at least one real-time bi-directional object identifier device comprising:
  - known positions of the at least one FLI and the at least one NCE receiving the signal,
  - historical recorded positions of the object,
  - characteristics of the receivers receiving the signal,
  - strength of the received signal,
  - type of the signal, and
  - whether the signal was repeated;
- the object association module (OAM) is configured to prevent false associations comprising an object type, a first locale (L1), a second locale (L2), a time spent in the first locale (tL1), and a time spent in the second locale (tL2), wherein if the tL1 is greater than or equal to a false association threshold time between L1 and L2 (tFALSE L1-L2) and the tL2 is less than the tFALSE L1-L2, association with L2 is prevented and only an association with L1 is made for the object having the specified object type, whereby a false association determination is prevented;
- an association determining module configured to determine an association between the at least one object and at least one of a locale, a role, and 3-D location based on the current 3-D location of the at least one object and its time duration there;
- an activity determining module comprising an activity detection sub-module and an activity information sub-module, the activity determining module configured to determine the activity involving the object based on the 3-D location of the object and activity information associated with predetermined activities;
- the activity detection sub-module comprising a pattern recognition application, the activity detection sub-module configured to detect an activity using a current location and a current locale based on correspondences of mapped contextual information, providing the detected activity to the activity determining module
- wherein the activity detection sub-module performs mappings of contextual information comprising
- mapping activities with minimum durations,
- mapping object identifiers with roles,
- mapping object identifiers with identities,
- mapping locales with activities,
- mapping current locales with activities,
- mapping a primary mean location with activities;
- mapping a primary mean locale with activities;
- mapping a primary mode location with activities;
- mapping a primary mode locale with activities;
- mapping roles with activities,
- mapping identities with activities,
- mapping associations with activities,
- mapping association types with minimum durations,
- mapping matched historical sets of locations with a set of current locations;
- mapping matched historical sets of locales with a set of current locales; and
- mapping combinations of current locale, role, identity, and association with activity,
- the pattern recognition application is configured to match the set of current locations with the historical set of locations and to match the set of current locales with the historical set of locales;
- the activity information determining sub-module comprising a mean/mode determiner, the activity information determining sub-module configured to determine items of information about an activity detected by the activity detection sub-module to provide to the activity determining module;
- the mean/mode determiner configured to determine the arithmetic mean and the mode of 3-D spatial locations of the object and the mean and the mode of locales of the object based on the present and historic values, wherein the arithmetic mean equals a sum of the present values and the historic values divided by the number of values, and wherein the mode equals the value most frequently occurring of the present and historic values,
- wherein the primary mean location is the arithmetic mean of 3-D spatial locations;
- wherein the primary mean locale is a the arithmetic mean of locales;

wherein the primary mode location is the mode of 3-D spatial locations;

wherein the primary mode locale is a the mode of locales;

wherein the mean/mode determiner provides the primary mean location, the primary mean locale, the primary mode location, and the primary mode locale as items of information to the activity information sub-module;

wherein the object identifier broadcasts the signal from the at least one real-time bi-directional object identifier device to the at least one FLI and the at least one NCE;

the NCE sends data broadcast in the object identifier signal with a timestamp to the location determining module the location determining module determines a current location of the object in relation to known structural features of the site the location determining module determines a current locale associated with the current location of the object from the mappings in the topology module the association determining module determines the association between the at least one object and at least one of a locale, a role, and 3-D location based on the current 3-D location of the at least one object and its time duration there; and the activity determining module determines the activity involving the object based on the 3-D location of the object and activity information associated with predetermined activities.

21. The system of claim 20, wherein the items of information comprise an identity of the object, a role of the object, an association between the object and a second object, or a series of historical locations.

22. The system of claim 20, further comprising:

a network, wherein the location determining module and the activity determining module are coupled to the network, the network connected element including at least one signaling component capable of transmitting or receiving signals, wherein the network connected element is configured to receive the data identifying the object provided by the real-time object identifier device and transmit a signal containing the data to the location determining module.

23. The system of claim 20, wherein the pattern recognition application comprises pattern recognition implemented by a Conformational Likeness algorithm operating on characters of names of locations and locales to determine the activity involving the object.

24. The system of claim 20, wherein the historical set of locations corresponding to an historical activity are determined by recording consecutive locations of the object by the system while the object was previously performing the historical activity.

25. A system for determining an activity involving at least one object at an indoor site, the system comprising:

a plurality of real-time bi-directional object identifier devices for a plurality of objects, each real-time bi-directional object identifier device linked with an object in the plurality of objects to provide data identifying the object, at least one fixed location identifier (FLI) providing data to determine a 3-D spatial location of the at least one object;

at least one network connected element (NCE) providing data to determine the 3-D spatial location of the at least one object;

at least one locale comprising spatial locations associated with a structural feature of the indoor site a topology module comprising spatial locations mapped to the structural features of the indoor site, whereby the locales are defined by their spatial locations and stored, 3-D spatial locations of the FLIs and the NCEs are stored, and false-association threshold times for locales and object-types are stored;

a location determining module (LDM) comprising an object location module (OLM) and an object association module (OAM), the LDM is configured to determine a location of the object from the data identifying the object, wherein the location of the object is a point in space defined by the 3-D spatial coordinates of the real-time bi-directional object identifier device;

the object location module (OLM) is configured to calculate a 3-D spatial location origin of a signal from the at least one real-time bi-directional object identifier device comprising:

known positions of the at least one FLI and the at least one NCE receiving the signal, historical recorded positions of the object, characteristics of the receivers receiving the signal, strength of the received signal, type of the signal, and whether the signal was repeated;

the object association module (OAM) is configured to prevent false associations comprising an object type, a first locale (L1), a second locale (L2), a time spent in the first locale (tL1), and a time spent in the second locale (tL2), wherein if the tL1 is greater than or equal to a false association threshold time between L1 and L2 (tFALSE L1-L2) and the tL2 is less than the tFALSE L1-L2, association with L2 is prevented and only an association with L1 is made for the object having the specified object type, whereby a false association determination is prevented;

an association determining module configured to determine an association between the at least one object and at least one of a locale, a role, and 3-D location based on the current 3-D location of the at least one object and its time duration there;

an activity determining module comprising an activity detection sub-module and an activity information sub-module, the activity determining module configured to determine the activity involving the object based on the 3-D location of the object and activity information associated with predetermined activities;

the activity detection sub-module comprising a pattern recognition application, the activity detection sub-module configured to detect an activity using a current location and a current locale based on correspondences of mapped contextual information, providing the detected activity to the activity determining module wherein the activity detection sub-module performs mappings of contextual information comprising mapping activities with minimum durations, mapping object identifiers with roles, mapping object identifiers with identities, mapping locales with activities, mapping current locales with activities, mapping a primary mean location with activities;

mapping a primary mean locale with activities;

mapping a primary mode location with activities;

mapping a primary mode locale with activities;

mapping roles with activities, mapping identities with activities, mapping associations with activities,
mapping association types with minimum durations,
mapping matched historical sets of locations with a set of current locations;
mapping matched historical sets of locales with a set of current locales; and
mapping combinations of current locale, role, identity, and association with activity,
the pattern recognition application is configured to match the set of current locations with the historical set of locations and to match the set of current locales with the historical set of locales;
the activity information determining sub-module comprising a mean/mode determiner, the activity information determining sub-module configured to determine items of information about an activity detected by the activity detection sub-module to provide to the activity determining module;
the mean/mode determiner configured to determine the arithmetic mean and the mode of 3-D spatial locations of the object and the mean and the mode of locales of the object based on the present and historic values, wherein the arithmetic mean equals a sum of the present values and the historic values divided by the number of values, and wherein the mode equals the value most frequently occurring of the present and historic values,
wherein the primary mean location is the arithmetic mean of 3-D spatial locations;
wherein the primary mean locale is a the arithmetic mean of locales;
wherein the primary mode location is the mode of 3-D spatial locations;
wherein the primary mode locale is a the mode of locales;
wherein the mean/mode determiner provides the primary mean location, the primary mean locale, the primary mode location, and the primary mode locale as items of information to the activity information sub-module;
wherein the object identifier broadcasts the signal from the at least one real-time bi-directional object identifier device to the at least one FLI and the at least one NCE;
the NCE sends data broadcast in the object identifier signal with a timestamp to the location determining module
the location determining module determines a current location of the object in relation to known structural features of the site
the location determining module determines a current locale associated with the current location of the object from the mappings in the topology module
the association determining module determines the association between the at least one object and at least one of a locale, a role, and 3-D location based on the current 3-D location of the at least one object and its time duration there;
the activity determining module determines the activity involving the object based on the 3-D location of the object and activity information associated with predetermined activities; and
wherein the activity detection sub-module further comprises an activity template whereby activities are matched with events and respective events are initiated upon positive matching.

26. The system of claim 25, wherein the activity determining module determines an activity from a role transmitted from the real-time object identifier device, wherein the identity is unknown, whereby the object remains anonymous.

27. The system of claim 25, wherein the activity information determining sub-module transmits a first request to the LDM to track locations of objects involved in a detected activity at the detected activity's start time and transmits a second request to the LDM to stop transmitting the object locations when the detected activity ends.

28. A method for determining an activity involving at least one object, the method comprising:
providing at least one real-time object identifier device linked with the at least one object for providing data identifying the object,
providing at least one fixed location identifier (FLI) providing data to determine a 3-D spatial location of the at least one object;
providing at least one network connected element (NCE) providing data to determine the 3-D spatial location of the at least one object;
at least one locale comprising spatial locations associated with a structural feature of the site
providing a topology module comprising spatial locations mapped to the structural features of the site, whereby the locales are defined by their spatial locations and stored, 3-D spatial locations of the FLIs and the NCEs are stored, and false-association threshold times for locales and object-types are stored;
providing a location determining module (LDM) comprising an object location module (OLM) and an object association module (OAM), the LDM is configured to determine a location of the object from the data identifying the object, wherein the location of the object is a point in space defined by the 3-D spatial coordinates of the real-time bi-directional object identifier device;
calculating, in the object location module (OLM), a 3-D spatial location origin of a signal from the at least one real-time bi-directional object identifier device comprising:
known positions of the at least one FLI and the at least one NCE receiving the signal,
historical recorded positions of the object,
characteristics of the receivers receiving the signal,
strength of the received signal,
type of the signal, and
whether the signal was repeated;
preventing, in the object association module (OAM), false associations comprising an object type, a first locale (L1), a second locale (L2), a time spent in the first locale (tL1), and a time spent in the second locale (tL2), wherein if the tL1 is greater than or equal to a false association threshold time between L1 and L2 (tFALSE L1-L2) and the tL2 is less than the tFALSE L1-L2, association with L2 is prevented and only an association with L1 is made for the object having the specified object type, whereby a false association determination is prevented;
determining, in an association determining module, an association between the at least one object and at least one of a locale, a role, and 3-D location based on the current 3-D location of the at least one object and its time duration there;
providing an activity determining module comprising an activity detection sub-module and an activity information sub-module;
determining, in the activity determining module, the activity involving the object based on the 3-D location of the object and activity information associated with predetermined activities;
providing in the activity detection sub-module comprising a pattern recognition application;

detecting, in the activity detection sub-module, an activity using a current location and a current locale based on correspondences of mapped contextual information, providing the detected activity to the activity determining module wherein the activity detection sub-module performs mappings of contextual information comprising mapping activities with minimum durations,
mapping object identifiers with roles,
mapping object identifiers with identities,
mapping locales with activities,
mapping current locales with activities,
mapping a primary mean location with activities;
mapping a primary mean locale with activities;
mapping a primary mode location with activities;
mapping a primary mode locale with activities;
mapping roles with activities,
mapping identities with activities,
mapping associations with activities,
mapping association types with minimum durations,
mapping matched historical sets of locations with a set of current locations;
mapping matched historical sets of locales with a set of current locales; and
mapping combinations of current locale, role, identity, and association with activity,
matching, in the pattern recognition application, the set of current locations with the historical set of locations and matching the set of current locales with the historical set of locales;
providing, in the activity information determining sub-module, a mean/mode determiner;
determining, in the activity information determining sub-module, items of information about an activity detected by the activity detection sub-module to provide to the activity determining module;
determining, in the mean/mode determiner, the arithmetic mean and the mode of 3-D spatial locations of the object and the mean and the mode of locales of the object based on the present and historic values, wherein the arithmetic mean equals a sum of the present values and the historic values divided by the number of values, and wherein the mode equals the value most frequently occurring of the present and historic values,
wherein the primary mean location is the arithmetic mean of 3-D spatial locations;
wherein the primary mean locale is a the arithmetic mean of locales;
wherein the primary mode location is the mode of 3-D spatial locations;
wherein the primary mode locale is a the mode of locales;
wherein the mean/mode determiner provides the primary mean location, the primary mean locale, the primary mode location, and the primary mode locale as items of information to the activity information sub-module;
broadcasting, from the at least one real-time bi-directional object identifier device, to the at least one FLI and the at least one NCE;
sending, from the NCE, data broadcast in the object identifier signal with a timestamp to the location determining module
determining, in the location determining module, a current location of the object in relation to known structural features of the site
determining, in the location determining module, a current locale associated with the current location of the object from the mappings in the topology module determining, in the association determining module, the association between the at least one object and at least one of a locale, a role, and 3-D location based on the current 3-D location of the at least one object and its time duration there; and determining, in the activity determining module, the activity involving the object based on the 3-D location of the object and activity information associated with predetermined activities.

29. The method of claim 28, wherein the location comprises at least one locale, the locale being any one of an area, site, location, point of interest, patient room, emergency room, operating room, intensive care room, quarantine room, laboratory, and equipment room, the locale comprising the spatial location defined within the stored topology of the site in which the activity involving the object occurs.

30. The method of claim 28, wherein the activity determining module displays records of the detected activities and information associated with the detected activities on a display device.

31. The method of claim 28, wherein the items of information comprise an identity of the object,
a role of the object, an association between the object and a second object, or
a series of historical locations.

32. The method of claim 28, wherein providing the real-time object identifier device further comprises:
transmitting a signal including the data identifying the object,
receiving a signal requesting the data identifying the object, and
controlling the transmitter and the receiver.

33. The method of claim 28, wherein determining the location of the object further comprises:
receiving a signal from the real-time object identifier device providing the data identifying the object, and
transmitting a request for data identifying the object.

34. The method of claim 28, further comprising:
providing a network, wherein the location determining module and the activity determining module are coupled to the network,
the network connected element including at least one signaling component capable of transmitting or receiving signals, wherein the network connected element is configured to receive the data identifying the object provided by the real-time object identifier device and transmit a signal containing the data to the location determining module.

35. The method of claim 28, wherein the association determining module is configured to:
use the location of the object and the locale of the object to determine if the object is in proximity to the locale for a time period greater than or equal to a threshold time, wherein if the time period that the object is in proximity to the locale is greater than or equal to a locale threshold time, determine the association between the object and the locale.

36. The method of claim 28, wherein the activity determining module determines an activity from a role transmitted from the real-time object identifier device, wherein the identity is unknown, whereby the object remains anonymous.

37. The method of claim 28, wherein the step of determining a location comprises at least one locale,
wherein the at least one locale is defined by a real-time object identifier device linked with the locale by placement at that location in space, the locale being any one of an area, site, location, point of interest, patient room, emergency room, operating room, intensive care room, quarantine room, laboratory, and equipment room, the locale comprising the spatial location defined within a stored topology of a facility in which the activity involving the object occurs.

38. The method of claim 28, wherein determining the activity comprises detecting the activity, wherein detecting the activity further comprises:
    determining a time duration for which the object is located at the location, and
    detecting the activity only if the object is located at the location for at least a predetermined time duration.

39. The method of claim 28, wherein determining the activity comprises detecting the activity, wherein detecting the activity further comprises:
    receiving a series of historical locations or locales of the object, the series of historical locations corresponding to a historical activity involving the object,
    comparing the series of locations of the object with the series of historical locations of the object, and
    detecting that the object is involved in the historical activity if the series of current locations matches the series of historical locations.

40. The method of claim 28, wherein the historical set of locations corresponding to an historical activity are determined by recording consecutive locations of the object by the system while the object was previously performing the historical activity.

41. The method of claim 28, wherein the activity information determining sub-module transmits a first request to the LDM to track locations of objects involved in a detected activity at the detected activity's start time and transmits a second request to the LDM to stop transmitting the object locations when the detected activity ends.

42. The method of claim 28, wherein the activity detection sub-module further comprises an activity template whereby activities are matched with events and respective events are initiated upon positive matching.

43. The method of claim 28, wherein the activity determining module detects the activity based on at least one primary location of the object, the role of the object, and an association between the object role and the at least one primary location, wherein the activity is any one of
    a surgical procedure activity comprising the roles of surgeon, patient, and nurse, and the primary location is an operating room;
    a nurse rounds activity comprising the roles of nurse and a plurality of patients, and the primary location is a plurality of patient rooms;
    a cleaning rounds activity comprising the role of janitor, and the primary location is a plurality of patient rooms;
    an x-ray scanning activity comprising the roles of x-ray technician, patient, and x-ray machine, and the primary location is a patient room; and
    a blood testing activity comprising the roles of phlebotomist and patient, and the primary location is a patient room.

44. The method of claim 28, further comprising:
    using pattern recognition to compare a series of current locations or locales of the object with a series of historical locations or locales of the object, wherein the pattern recognition is implemented by a Conformational Likeness algorithm operating on characters of names of locations and locales to determine the activity involving the object.

45. A method for determining an activity involving at least one object at an indoor site, the method comprising the steps of:
    providing at least one real-time object identifier device linked with the at least one object to provide data identifying the object,
    providing at least one fixed location identifier (FLI) providing data to determine a 3-D spatial location of the at least one object;
    providing at least one network connected element (NCE) providing data to determine the 3-D spatial location of the at least one object;
    at least one locale comprising spatial locations associated with a structural feature of the indoor site;
    providing a topology module comprising spatial locations mapped to the structural features of the indoor site, whereby the locales are defined by their spatial locations and stored, 3-D spatial locations of the FLIs and the NCEs are stored, and false-association threshold times for locales and object-types are stored;
    providing a location determining module (LDM) comprising an object location module (OLM) and an object association module (OAM), the LDM is configured to determine a location of the object from the data identifying the object, wherein the location of the object is a point in space defined by the 3-D spatial coordinates of the real-time bi-directional object identifier device;
    calculating, in the object location module (OLM), a 3-D spatial location origin of a signal from the at least one real-time bi-directional object identifier device comprising:
    known positions of the at least one FLI and the at least one NCE receiving the signal,
    historical recorded positions of the object,
    characteristics of the receivers receiving the signal,
    strength of the received signal,
    type of the signal, and
    whether the signal was repeated;
    preventing, in the object association module (OAM), false associations comprising an object type, a first locale (L1), a second locale (L2), a time spent in the first locale (tL1), and a time spent in the second locale (tL2), wherein if the tL1 is greater than or equal to a false association threshold time between L1 and L2 (tFALSE L1-L2) and the tL2 is less than the tFALSE L1-L2, association with L2 is prevented and only an association with L1 is made for the object having the specified object type, whereby a false association determination is prevented;
    determining, in an association determining module, an association between the at least one object and at least one of a locale, a role, and 3-D location based on the current 3-D location of the at least one object and its time duration there;
    providing an activity determining module comprising an activity detection sub-module and an activity information sub-module;
    determining, in the activity determining module, the activity involving the object based on the 3-D location of the object and activity information associated with predetermined activities;
    providing in the activity detection sub-module, a pattern recognition application;
    detecting, in the activity detection sub-module, an activity using a current location and a current locale based on correspondences of mapped contextual information, providing the detected activity to the activity determining module wherein the activity detection sub-module performs mappings of contextual information comprising mapping activities with minimum durations,
mapping object identifiers with roles,
mapping object identifiers with identities,
mapping locales with activities,
mapping current locales with activities,
mapping a primary mean location with activities;
mapping a primary mean locale with activities;
mapping a primary mode location with activities;
mapping a primary mode locale with activities;
mapping roles with activities,
mapping identities with activities,
mapping associations with activities,
mapping association types with minimum durations,
mapping matched historical sets of locations with a set of current locations;
mapping matched historical sets of locales with a set of current locales; and
mapping combinations of current locale, role, identity, and association with activity,
matching, in the pattern recognition application, the set of current locations with the historical set of locations and matching the set of current locales with the historical set of locales;
providing, in the activity information determining sub-module, a mean/mode determiner;
determining, in the activity information determining sub-module, items of information about an activity detected by the activity detection sub-module to provide to the activity determining module;
determining, in the mean/mode determiner, the arithmetic mean and the mode of 3-D spatial locations of the object and the mean and the mode of locales of the object based on the present and historic values, wherein the arithmetic mean equals a sum of the present values and the historic values divided by the number of values, and wherein the mode equals the value most frequently occurring of the present and historic values,
wherein the primary mean location is the arithmetic mean of 3-D spatial locations;
wherein the primary mean locale is the arithmetic mean of locales;
wherein the primary mode location is the mode of 3-D spatial locations;
wherein the primary mode locale is a the mode of locales;
wherein the mean/mode determiner provides the primary mean location, the primary mean locale, the primary mode location, and the primary mode locale as items of information to the activity information sub-module;
broadcasting, from the at least one real-time bi-directional object identifier device, to the at least one FLI and the at least one NCE;
sending, from the NCE, data broadcast in the object identifier signal with a timestamp to the location determining module
determining, in the location determining module, a current location of the object in relation to known structural features of the site
determining, in the location determining module, a current locale associated with the current location of the object from the mappings in the topology module
determining, in the association determining module, the association between the at least one object and at least one of a locale, a role, and 3-D location based on the current 3-D location of the at least one object and its time duration there; and
determining, in the activity determining module, the activity involving the object based on the 3-D location of the object and activity information associated with predetermined activities.

46. The method of claim 45, wherein at least one location is defined by a real-time object identifier device linked with the location by placement at that location in space.

47. The method of claim 45, wherein the historical set of indoor locations corresponding to the historical activity is determined by recording the consecutive locations of the object by the system while the object was previously performing the historical activity.

48. The method of claim 45, wherein the information associated with the activity of the object comprises a type of activity, a time of the activity, and a duration of the activity.

49. A method for determining an activity involving at least one object at an indoor site, the method comprising:
providing a plurality of real-time object identifier devices for a plurality of objects, each real-time object identifier device linked with an object in the plurality of objects for providing data identifying the object,
providing at least one fixed location identifier (FLI) providing data to determine a 3-D spatial location of the at least one object;
providing at least one network connected element (NCE) providing data to determine the 3-D spatial location of the at least one object;
at least one locale comprising spatial locations associated with a structural feature of the indoor site
providing a topology module comprising spatial locations mapped to the structural features of the indoor site, whereby the locales are defined by their spatial locations and stored, 3-D spatial locations of the FLIs and the NCEs are stored, and false-association threshold times for locales and object-types are stored;
providing a location determining module (LDM) comprising an object location module (OLM) and an object association module (OAM), the LDM is configured to determine a location of the object from the data identifying the object, wherein the location of the object is a point in space defined by the 3-D spatial coordinates of the real-time bi-directional object identifier device;
calculating, in the object location module (OLM), a 3-D spatial location origin of a signal from the at least one real-time bi-directional object identifier device comprising:
known positions of the at least one FLI and the at least one NCE receiving the signal,
historical recorded positions of the object,
characteristics of the receivers receiving the signal,
strength of the received signal,
type of the signal, and
whether the signal was repeated;
preventing, in the object association module (OAM), false associations comprising an object type, a first locale (L1), a second locale (L2), a time spent in the first locale (tL1), and a time spent in the second locale (tL2), wherein if the tL1 is greater than or equal to a false association threshold time between L1 and L2 (tFALSE L1-L2) and the tL2 is less than the tFALSE L1-L2, association with L2 is prevented and only an association with L1 is made for the object having the specified object type, whereby a false association determination is prevented;

determining, in an association determining module, an association between the at least one object and at least one of a locale, a role, and 3-D location based on the current 3-D location of the at least one object and its time duration there;

providing an activity determining module comprising an activity detection sub-module and an activity information sub-module;

determining, in the activity determining module, the activity involving the object based on the 3-D location of the object and activity information associated with predetermined activities;

providing in the activity detection sub-module, a pattern recognition application;

detecting, in the activity detection sub-module, an activity using a current location and a current locale based on correspondences of mapped contextual information, providing the detected activity to the activity determining module wherein the activity detection sub-module performs mappings of contextual information comprising mapping activities with minimum durations, mapping object identifiers with roles, mapping object identifiers with identities, mapping locales with activities, mapping current locales with activities, mapping a primary mean location with activities;

mapping a primary mean locale with activities;

mapping a primary mode location with activities;

mapping a primary mode locale with activities;

mapping roles with activities, mapping identities with activities, mapping associations with activities, mapping association types with minimum durations, mapping matched historical sets of locations with a set of current locations;

mapping matched historical sets of locales with a set of current locales; and mapping combinations of current locale, role, identity, and association with activity, matching, in the pattern recognition application, the set of current locations with the historical set of locations and matching the set of current locales with the historical set of locales;

providing, in the activity information determining sub-module, a mean/mode determiner;

determining, in the activity information determining sub-module, items of information about an activity detected by the activity detection sub-module to provide to the activity determining module;

determining, in the mean/mode determiner, the arithmetic mean and the mode of 3-D spatial locations of the object and the mean and the mode of locales of the object based on the present and historic values, wherein the arithmetic mean equals a sum of the present values and the historic values divided by the number of values, and wherein the mode equals the value most frequently occurring of the present and historic values, wherein the primary mean location is the arithmetic mean of 3-D spatial locations;

wherein the primary mean locale is a the arithmetic mean of locales;

wherein the primary mode location is the mode of 3-D spatial locations;

wherein the primary mode locale is a the mode of locales;

wherein the mean/mode determiner provides the primary mean location, the primary mean locale, the primary mode location, and the primary mode locale as items of information to the activity information sub-module;

broadcasting, from the at least one real-time bi-directional object identifier device, to the at least one FLI and the at least one NCE;

sending, from the NCE, data broadcast in the object identifier signal with a timestamp to the location determining module determining, in the location determining module, a current location of the object in relation to known structural features of the site determining, in the location determining module, a current locale associated with the current location of the object from the mappings in the topology module determining, in the association determining module, the association between the at least one object and at least one of a locale, a role, and 3-D location based on the current 3-D location of the at least one object and its time duration there; and determining, in the activity determining module, the activity involving the object based on the 3-D location of the object and activity information associated with predetermined activities, wherein the activity information determining sub-module transmits a first request to the LDM to track locations of objects involved in a detected activity at the detected activity's start time and transmits a second request to the LDM to stop transmitting the object locations when the detected activity ends.

50. The method of claim 49, wherein the activity determining module detects the activity based on at least one primary location of the object, a role of the object, and an association between the object and the at least one primary location, wherein the activity is any one of a surgical procedure activity comprising the roles of surgeon, patient, and nurse, and the primary location is an operating room;

a nurse rounds activity comprising the roles of nurse and a plurality of patients, and the primary location is a plurality of patient rooms;

a cleaning rounds activity comprising the role of janitor, and the primary location is a plurality of patient rooms;

an x-ray scanning activity comprising the roles of x-ray technician, patient, and x-ray machine, and the primary location is a patient room; and a blood testing activity comprising the roles of phlebotomist and patient, and the primary location is a patient room.

* * * * *